(12) United States Patent
Iwabuchi

(10) Patent No.: US 6,504,671 B2
(45) Date of Patent: Jan. 7, 2003

(54) RECORDING MEDIUM CARTRIDGE LIBRARY APPARATUS WITH TRANSFER-ROLLERS

(75) Inventor: Masanori Iwabuchi, Ibaraki (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 09/725,216

(22) Filed: Nov. 29, 2000

(65) Prior Publication Data

US 2001/0040757 A1 Nov. 15, 2001

(30) Foreign Application Priority Data

Nov. 29, 1999 (JP) .......................................... 11-337550

(51) Int. Cl.[7] .............................................. G11B 15/68
(52) U.S. Cl. ...................................................... 360/92
(58) Field of Search .............................. 360/92, 91, 90, 360/88, 98.04, 98.06; 369/30.4, 30.43, 30.45, 30.49, 30.65, 30.7, 30.72, 75.2, 191

(56) References Cited

U.S. PATENT DOCUMENTS 5,337,297 A * 8/1994 Kvifte et al. ................... 360/92
5,502,697 A * 3/1996 Taki ............................. 360/92
5,652,682 A   7/1997 Elliott

FOREIGN PATENT DOCUMENTS

JP   1-237952 A   *   9/1989
JP   6-20359          1/1994

* cited by examiner

Primary Examiner—Robert S. Tupper
Assistant Examiner—Julie Anne Watko
(74) Attorney, Agent, or Firm—Sughrue Mion, PLLC

(57) ABSTRACT

A recording medium library apparatus is constructed of a magnetic tape library apparatus which is capable of smoothly transferring a magnetic tape cartridge among a carrier, a cartridge storage portion and a read/write portion by sandwiching the magnetic tape cartridge between cartridge transfer-rollers and a row of rollers. In the recording medium library apparatus, during a final stage of a loading operation of the magnetic tape cartridge into the read/write portion or into the cartridge storage portion, a roller arm itself is rotary driven on its center pin in a manner such that cartridge transfer-rollers pivoted to each of opposite-end portions of the roller arm directly pushes a rear-end surface or a front end surface of the magnetic tape cartridge. Consequently, it is possible for the magnetic tape library apparatus to perform smooth transfer operation of the magnetic tape cartridge and direct pushing operation of the rear-end surface or the front end surface of the magnetic tape cartridge at the final stage of the loading operation of the magnetic tape cartridge, without fail.

20 Claims, 10 Drawing Sheets before reaching stroke end

RECORDING MEDIUM CARTRIDGE LIBRARY APPARATUS WITH TRANSFER-ROLLERS

BACKGROUND OF THE INVENTION

1. Field of the Invention

The present invention relates to a recording medium library apparatus such as a magnetic tape library apparatus, a magneto-optical (MO) library apparatus, an optical (CD, or a like) library apparatus and a like, and more particularly to an improvement in a recording medium loading/unloading mechanism mounted on a carrier of the recording medium library apparatus.

The present application claims the Convention Priority of Japanese Patent Application No. Hei 11-337550 filed on November 29,1999, which is hereby incorporated by reference.

2. Description of the Related Art

As a magnetic tape cartridge loading/unloading mechanism, there have been conventionaly known two types of mechanisms. One is of a pickup-hand type, and an other is of a roller/belt type. A mechanism of the pickup-hand type uses a pickup hand to pick up and transfer a magnetic tape cartridge among a cartridge storage portion, a read/write portion and a carrier. On an other hand, a mechanism of the roller/belt type uses a roller and a transfer belt to transfer the magnetic tape cartridge among the cartridge storage portion, the read/write portion and the carrier.

Now, problems to be solved by the present invention will be described with reference to FIGS. 9A and 9B, wherein: FIG. 9A shows a side view of a first conventional magnetic tape library apparatus 100 provided with a carrier having a tape cartridge loading/unloading mechanism in which the pickup hand is used; and, FIG. 9B shows a plan view of the first conventional magnetic tape library apparatus 100 shown in FIG. 9A, illustrating the pickup hand used in the tape cartridge- loading/unloading mechanism of the first conventional magnetic tape library apparatus 100.

This first conventional magnetic tape library apparatus 100 is constructed of: a cartridge storage portion 102 for storing a plurality of magnetic tape cartridges 101 therein; a read/write portion 103 for reading/writing data from/to a magnetic tape of a desired one of the magnetic tape cartridges 101; and, a carrier 104 which is reciprocally moved between the cartridge storage portion 102 and the read/write portion 103 to receive and deliver the desired one of the magnetic tape cartridges 101.

As shown in FIG. 9A, in the cartridge storage portion 102, a plurality of cells each of which contains each of the magnetic tape cartridges 101 therein are packed together vertically in a stack. Disposed over this stack of the plurality of cells is the read/write portion 103 which is fixedly mounted in the first conventional magnetic tape library apparatus 100.

On the other hand, the carrier 104 is movably mounted in the first conventional magnetic tape library apparatus 100 in a manner such that the carrier 104 is slidably moved up and down by means of a suitable elevator mechanism (not shown) along a pair of guide rods 105 and freely transferred between: its uppermost position corresponding to an uppermost one of the plurality of cells in the cartridge storage portion 102; and, its lowermost position corresponding to a lowermost one of the plurality of cells in the cartridge storage portion 102.

As shown in FIG. 9B, the carrier 104 is provided with a pickup hand 106 which serves as the tape cartridge loading/unloading mechanism.

In an unloading (retrieving) operation of the magnetic tape cartridge 101 from the cartridge- storage portion 102 or from the read/write portion 103, the above-mentioned elevator mechanism (not shown) vertically drives the carrier 104 to a target position 10 corresponding to a desired one of the magnetic tape cartridges 101 received in the cartridge storage portion 102 or received in the read/write portion 103. After that, the pickup hand 106 is moved right as viewed in FIG. 9B to have a pair of front end pawls 108 of its arms 107 catch an end portion of the desired magnetic tape cartridge 101. Under such circumstances, the pickup hand 106 is then moved back left as viewed in FIG. 9B to unload or retrieve the magnetic tape cartridge 101 from the cartridge storage portion 102 or from the read/write portion 103. A thus retrieved cartridge 101 is temporarily disposed and held stationary in the carrier 104.

On the other hand, in loading the thus retrieved cartridge 101 of the carrier 104 into the cartridge storage portion 102 or into the read/write portion 103, the magnetic tape cartridge 101 is moved to the right (as viewed in FIG. 9B) while being caught in a space between the pawls 108 of the pickup hand 106, so that the magnetic tape cartridge 101 is positively inserted (loaded) into the cartridge storage portion 102 or into the read/write portion 103 by means of the pickup hand 106.

The first conventional magnetic tape library apparatus 100 having the above construction is advantageous in that it may perform the loading/unloading operation of the magnetic tape cartridge 101 without fail using the pickup hand 106. However, the first conventional magnetic tape library apparatus 100 is disadvantageous in that the loading/unloading operation of the magnetic tape cartridge 101 is so limited as to be performed only in one of the opposite-side portions of the carrier 104, for example such as a right side area of the carrier 104 as viewed in FIG. 9B. As a result, it is necessary for the first conventional magnetic tape library apparatus 100 to have the cartridge storage portion 102 and the read/write portion 103 vertically stacked together in the right side area of the carrier 104 as viewed in FIG. 9B. This can be a problem in a case where the first conventional magnetic tape library apparatus 100 is required to reduce its height in its design process.

Further, since it is necessary for the first conventional magnetic tape library apparatus 100 to have the pickup hand 106 to be disposed on an extension line of a loading/unloading path of the magnetic tape cartridge 101, an entire length of the carrier 104 is equal to at least a sum of an entire length of the magnetic tape cartridge 101 and a length of the pickup hand 106, as shown in FIG. 9B. This makes it difficult to reduce in size the carrier 104.

On the other hand, FIG. 10A shows a side view of a second conventional magnetic tape library apparatus 109, illustrating a carrier 110 provided with a tape cartridge loading/unloading mechanism in which two rows of rollers 111 serve as a means for transferring the magnetic tape cartridge 101. FIG. 10B shows a plan view of the second conventional magnetic tape library apparatus 109 shown in FIG. 10A, illustrating the carrier 110 provided with the tape cartridge loading/unloading mechanism in which the two rows of the rollers 111 serve as the means for transferring the magnetic tape cartridge 101.

As is in the first conventional magnetic tape library apparatus 100 shown in FIGS. 9A and 9B, the second conventional magnetic tape library apparatus 109 shown in FIGS. 10A and 10B is also provided with: the cartridge storage portion 102 for storing the magnetic tape cartridge 101 therein; the read/write portion 103 for reading/writing data from/to the magnetic tape of the magnetic tape cartridge 101; and, the carrier 110 which is reciprocally moved between the cartridge storage portion 102 and the read/write portion 103 to receive and deliver the magnetic tape cartridge 101. The carrier 110 is movably mounted in the second conventional magnetic tape library apparatus 109 in a manner such that the carrier 110 is slidably moved up and down by means of a suitable elevator mechanism along the pair of the guide rods 105 and freely transferred between: its uppermost position corresponding to the uppermost one of the plurality of cells in the cartridge storage portion 102; and, its lowermost position corresponding to the lowermost one of the plurality of cells in the cartridge storage portion 102.

As shown in FIG. 10, the carrier 110 is provided with two rows of rollers 111 for loading/unloading the magnetic tape cartridge 101. In the second conventional magnetic tape library apparatus 109, the pickup hand 106 of the first conventional magnetic tape library apparatus 100 is replaced with the two rows of the rollers 111. More specifically, in the loading/unloading operation of the magnetic tape cartridge 101, the cartridge 101 is loaded/unloaded into/from the cartridge storage portion 102 or into/from the read/write portion 103 while being sandwiched between the two rows of the rollers 111.

Since the second conventional magnetic tape library apparatus 109 has the above construction, it is possible to transfer the magnetic tape cartridge 101 through an interior of the carrier 110 in the loading/unloading operation of the magnetic tape cartridge 101. Due to this, as is clear from FIGS. 10A and 10B, it is possible for the second conventional magnetic tape library apparatus 109 to perform the loading/unloading operation of the magnetic tape cartridge 101 in opposite-side portions of the carrier 110. Consequently, as shown in FIGS. 10A and 10B, it is possible to separate the cartridge storage portion 102 from the read/write portion 103 so as to be disposed in one of the opposite-side portions of the carrier 110 in a condition in which the read/write portion 103 is disposed in the other of the opposite-side portions of the carrier 110. Further, as is in the first conventional magnetic tape library apparatus 100, it is also possible for the second conventional apparatus 109 to stack the cartridge storage portion 102 and the read/write portion 103 together vertically in a stack. Due to this, the second conventional magnetic tape library apparatus 109 is considerably improved in design freedom in comparison with the first conventional magnetic tape library apparatus 100. Further, the second conventional magnetic tape library apparatus 109 is not required to dispose its cartridge loading/unloading mechanism on an extension line of the loading/unloading path of the magnetic tape cartridge 101. This makes it possible to reduce in size the carrier 110 in the second conventional magnetic tape library apparatus 109.

However, in the case of the second conventional magnetic tape library apparatus 109, there is a danger that the magnetic tape cartridge 101 is not sufficiently loaded into the cartridge storage portion 162 or into the read/write portion 103 since a final stage of its loading operation is performed only by means of the two rows of the rollers 111. More specifically, in a case where dust or a like settles on the opposite-side surfaces of the magnetic tape cartridge 101 and/or the two rows of the rollers 111 themselves have worn, the rollers 111 tend to slip on the opposite-side surfaces of the magnetic tape cartridge 101 in the loading/unloading operation of the magnetic tape cartridge 101, which often results in a failure in the loading/unloading operation of the magnetic tape cartridge 101.

In a case where the tape cartridge loading/unloading mechanism employs a transfer belt (not shown) in the second conventional magnetic tape library apparatus 109, such transfer belt is trained over each of the two rows of the rollers 111 so as to run round these rollers 111. However, even when the transfer belt runs round the two row of the rollers 111, there is a danger that these transfer belts slip on the opposite-side surfaces of the magnetic tape cartridge 101 at the final stage of the loading/unloading operation of the magnetic tape cartridge 101 due to presence of the above-mentioned dust and/or roller wear, further due to a fact that only very limited narrow end portions of the transfer belts contribute to sandwiching or holding of the magnetic tape cartridge 101 at the final stage of the loading/unloading operation of the magnetic tape cartridge 101. In other words, at the final stage of the loading/unloading operation, a bulk of each of the transfer belts separates from the magnetic tape cartridge 101, and therefore does not contribute to holding of the cartridge 101 at all. Due to this, as shown in FIGS. 10A and 10B, the second conventional magnetic tape library apparatus 109 employing the transfer belts (not shown) together with the two rows of the rollers 111 is still disadvantageous due to a danger of slippage as is in the first conventional magnetic tape library apparatus 109 which employs the rollers 111 without employing the transfer belts.

SUMMARY OF THE INVENTION

In view of the above, it is an object of the present invention to provide a recording medium library apparatus capable of solving problems inherent in conventional apparatuses, and thereby realizing an improvement in a recording medium cartridge loading/unloading mechanism mounted on a carrier of the recording medium library apparatus.

According to a first aspect of the present invention, there is provided a recording medium library apparatus including: a cartridge storage portion for storing a plurality of recording medium cartridges such as magnetic tape cartridges therein; a read/write portion for reading/writing data from/to the recording medium cartridge; a carrier which is reciprocally moved between the cartridge storage portion and the read/write portion in a condition in which the carrier holds the recording medium cartridge therein; and, a recording medium cartridge loading/unloading mechanism provided in the carrier, an improvement wherein: the recording medium cartridge loading/unloading mechanism is of a transfer-roller type; and, at a final stage of a loading operation of the recording medium cartridge into the read/write portion or into the cartridge storage portion, the recording medium cartridge loading/unloading mechanism functions to positively push a rear-end portion or a front-end portion of the recording medium cartridge forward or rearward to complete the loading operation.

With the above construction, it is possible to positively push the rear-end portion or the front-end portion of the recording medium cartridge at the final stage of its loading operation in a loading direction to load the recording medium cartridge into the read/write portion or into the cartridge storage portion. In this loading operation, since the rear-end portion or the front-end portion of the recording medium cartridge is directly pushed by the recording medium cartridge loading/unloading mechanism in a direction perpendicular to the rear-end portion or the front-end portion of the recording medium cartridge, no slippage occurs with respect to the recording medium cartridge in this loading operation, even when the recording medium cartridge is soiled, and/or even when cartridge transfer-rollers have worn. This ensures that the recording medium cartridge is loaded into the read/write portion or into the cartridge storage portion without fail.

Also, according to a second aspect of the present invention, there is provided a recording medium library apparatus including: a cartridge storage portion for storing a plurality of recording medium cartridges therein; a read/write portion for reading/writing data from/to the recording medium cartridge; a carrier which is reciprocally moved between the cartridge storage portion and the read/write portion in a condition in which the carrier holds the recording medium cartridge therein; and, a recording medium cartridge loading/unloading mechanism provided in the carrier, improvement wherein: the recording medium cartridge loading/unloading mechanism is provided with: a pair of cartridge transfer-rollers which are disposed adjacent to a transfer path of the recording medium cartridge on the carrier, and spaced a predetermined distance away from each other in a loading/unloading direction of the recording medium cartridge; a roller arm which has the cartridge transfer-rollers pivoted to its opposite-end portions; a guide for guiding in motion the roller arm along the transfer path of the recording medium cartridge in the loading/unloading direction thereof; a roller arm linear driving means for linear driving the roller arm along the guide; a transfer-roller rotary driving means for rotatably driving the cartridge transfer-rollers in a manner such that the cartridge transfer-rollers linear move the recording medium cartridge in a direction in which the roller arm is linear driven; and, a roller arm rotary driving means for rotatably driving the roller arm itself when the roller arm reaches a front-end portion or a rear-end portion of the guide, in which end portion a trailing one or a leading one of the cartridge transfer-rollers separates from both the guide and a side surface of the recording medium cartridge outwardly on the carrier while the leading one or the trailing one of the cartridge transfer-rollers projects inwardly into the transfer path of the recording medium cartridge upon rotation of the roller arm.

Due to the above construction, the roller arm is linear driven by the roller arm linear driving mechanism in the cartridge loading/unloading direction while being guided through the guide. At a same time, the pair of the cartridge transfer-rollers both pivoted to the opposite-end portions of the roller arm are rotary driven through the transfer-roller rotary driving means.

In this case, the pair of the transfer-rollers rotate in a manner such that each of the transfer-rollers brought into contact with the side surface of the recording medium cartridge linear drives the recording medium cartridge in a direction in which the roller arm is linear driven. For example, in the case where the recording medium cartridge held in the carrier is moved in its loading direction so as to be loaded into the read/write portion or into the cartridge storage portion, the pair of the transfer-rollers rotate to linear drive the recording medium cartridge in such loading direction, and thereby loading the recording medium cartridge into the read/write portion or into the cartridge storage portion. On an other hand, in contrast with the above loading operation, in a case where the recording medium cartridge received in the read/write portion or in the cartridge storage portion is unloaded therefrom, the pair of the transfer-rollers rotate to linear drive the recording medium cartridge in its unloading direction, and thereby unloading the recording medium cartridge from the read/write portion or from the cartridge storage portion, whereby the thus unloaded recording medium cartridge is received in the carrier.

As described above, in each of: the loading operation, in which the recording medium cartridge is unloaded from the carrier and loaded to the read/write portion or to the cartridge storage portion; and, the unloading operation, in which the recording medium cartridge is unloaded from the read/write portion or from the cartridge storage portion, and loaded to the carrier, the recording medium cartridge is simultaneously subjected to both the cartridge linear driving operation performed by the roller arm and the cartridge feeding operation performed by rotational motion of the cartridge transfer-rollers. Namely, the linear motion of the roller arm is combined with the rotationally driven motion of its cartridge transfer-rollers to help speed and smooth the loading/unloading operation of the recording medium cartridge performed between the carrier and each of the cartridge storage portion and the read/write portion.

When the roller arm reaches the rear-end portion or the front-end portion of the guide at the final stage of the loading operation, the roller arm rotary driving mechanism is actuated to rotary drive the roller arm itself in a manner such that a trailing one or a leading one of the cartridge transfer-rollers separates from both the guide and the side surface of the recording medium cartridge outwardly on the carrier while the leading one or the trailing one of the cartridge transfer-rollers projects inwardly into the transfer path of the recording medium cartridge upon rotation of the roller arm.

Due to such rotational motion of the roller arm itself on its center pin, for example as for the trailing one of the cartridge transfer-rollers, such trailing cartridge transfer-roller is brought into contact with the rear-end of the recording medium cartridge and positively push a same cartridge in its loading direction. As described above, the recording medium cartridge does not depend on any frictional engagement between the cartridge transfer-rollers and the side surface of the recording medium cartridge at the final stage of its loading operation for loading the recording medium cartridge into the read/write portion or into the cartridge storage portion. Consequently, even when the recording medium cartridge is soiled and/or even when the cartridge transfer-rollers have worn, it is possible to load the recording medium cartridge into the read/write portion or into the cartridge storage portion without fail.

Furthermore, the roller arm is disposed adjacent to thee transfer path of the recording medium cartridge during the transfer operation of the recording medium cartridge. Only at the final stage of the loading operation in which an intense pushing force for positively pushing the recording medium cartridge is required, the roller arm is rotary driven to have its trailing one or its leading one of the cartridge transfer-rollers separate from both the guide and the side surface of the recording medium cartridge outwardly on the carrier, and to have the leading one or the trailing one of the cartridge transfer-rollers project inwardly into the transfer path of the recording medium cartridge and engage with the rear-end portion or the front-end portion of the recording medium cartridge. Due to this, it is possible to reduce an entire length of the recording medium library apparatus of the present invention in an easy manner in comparison with each of conventional apparatuses each provided with the recording medium cartridge loading/unloading mechanism in which a pickup hand, transfer-rollers and/or transfer belt are/is used.

In the foregoing, a preferable mode is one wherein: the guide extends substantially over the entire length of the carrier in the loading/unloading direction of the recording medium cartridge; and, the roller arm rotary driving means operates at a time when the roller arm reaches each of a forward end portion and a rearward end portion of the guide.

With the above construction, it is possible to perform the loading/unloading operation in the opposite-end portions of the carrier, without fail. Consequently, it is possible to dispose the cartridge storage portion and the read/write portion in the opposite-end portions of the carrier so that the cartridge storage portion is oppositely disposed from the read/write portion through the carrier.

Further, as described above, at the final stage of the loading operation of the recording medium cartridge into the read/write portion or into the cartridge storage portion, the roller arm itself is rotary driven by the roller arm rotary driving mechanism. As a result, the trailing one or the leading one of the cartridge transfer-rollers having been pivoted to the opposite-end portions of the roller arm directly pushes the rear-end portion or the front-end portion of the recording medium cartridge forward or rearward in its loading operation into the read/write portion or into the cartridge storage portion. Consequently, it is possible to completely solve problems inherent in conventional apparatuses in the loading operation of the recording medium cartridge.

With the above construction, it is possible to steadily hold the recording medium cartridge in its home position on the carrier. The transfer operation of the recording medium cartridge performed by means of the cartridge transfer-rollers is completed when the roller arm reaches each of the opposite-end portions of the guide. After that, the rear-end portion or the front-end portion of the recording medium cartridge passes over the trailing one or the leading one of the cartridge transfer-rollers, which permits the roller arm itself to rotate on the axis of its main-engaging projection (center pin). Due to such rotational motion of the roller arm, the trailing one or the leading one of the cartridge transfer-rollers projects into the transfer path of the recording medium cartridge, and directly pushes the rear-end portion of the front-end portion of the recording medium cartridge, so that the recording-medium cartridge is inserted or loaded into the read/write portion or into the cartridge storage portion in its loading operation, without fail.

It is also possible to dispose all the components of the apparatus of the present invention, for example recording medium library cartridge transfer-rollers, roller arm, guide, transfer-roller rotary driving means, and roller arm rotary driving means in each of the opposite-side portions of the carrier so as to sandwich the recording medium cartridge between these components such as the cartridge transfer-rollers and the like disposed in the opposite-side portions of the carrier. However, in order to simplify in construction the recording medium library apparatus of the present invention, these components of the recording medium library apparatus are preferably disposed in only one of the opposite-side portions of the carrier so as to be oppositely disposed from the row of rollers disposed in an other of the opposite-side portions of the carrier. The row of the rollers cooperates with the cartridge transfer-rollers of the one of the opposite-side portions of the carrier to sandwich the recording medium cartridge therebetween in the transfer operation of the recording medium cartridge.

It is possible for the recording medium library apparatus having the thus simplified construction to steadily accomplish the loading operation of the recording medium cartridge into the read/write portion or into the cartridge storage portion, because: as described above, at the final stage of the loading operation of the recording medium cartridge into the read/write portion or into the cartridge storage portion, the rear-end portion or the front-end portion of the recording medium cartridge is directly pushed forward or rearward by the trailing one or the leading one of the cartridge transfer-rollers.

Another preferable mode of the recording medium library apparatus provided with the cartridge loading/unloading mechanism is one wherein: the guide is constructed of a groove; a rack is disposed adjacent to the guide outside the transfer path of the recording medium cartridge to extend in parallel to the guide; a gear capable of meshing with the rack is integrally formed with the cartridge transfer-roller; a main-engaging projection is provided in a central portion of the roller arm, and slidably engaged with the guide in an insertion manner to ensure that the rack meshes with the gear without fail, so that the transfer-roller rotary driving means is constructed of the rack, the gear and the roller arm linear driving means, wherein the roller arm linear driving means moves the main-engaging projection along the guide; a sub-engaging projection is provided in the vicinity of each of a pair of pivoted portions of the cartridge transfer-rollers in the roller arm, wherein each of the sub-engaging projections is shorter in length than the main-engaging projection and slidably engaged with the guide together with the main-engaging projection (center pin of the roller arm) in an insertion manner; a sub-engaging projection separation area is formed in vicinity of each of a front-end portion and a rear-end portion of the guide to permit only the sub-engaging projections to escape from the groove of the guide through sub-engaging projection separation recesses by setting a height of the groove in each of the sub-engaging projection separation recesses at a value smaller than a length of the main-engaging projection having been inserted in the groove of the guide so as to prevent only the main-engaging projection from escaping from the groove in each of the sub-engaging projection separation recesses; a sub-guide which is identical in construction with the guide and connected with each of the front-end portion and the rear-end portion of the guide to form an extension thereof; and, the roller arm rotary driving means is constructed of the main-engaging projection, each of the sub-engaging projection, each of the sub-engaging projection separation recesses, each of the sub-guides, and the roller arm linear driving means.

In the above construction, the roller arm is linear driven by the roller arm linear driving means in a condition in which the roller arm has its main-engaging projection guided by the guide, which is constructed of the groove extending in the loading/unloading direction of the recording medium cartridge. As a result, the pair of the cartridge transfer-rollers, which are pivoted to the opposite-end portions of the roller arm and have their gears meshed with the rack extending in parallel to the guide, are rotary driven when their gears are moved relative to the rack. Namely, in this case, the transfer-roller rotary driving means is constructed of the roller arm linear driving means, the rack, and the gears meshing with the rack. Since the rack is positioned in an area outer than the positions of the cartridge transfer-rollers and meshes with the gears of these cartridge transfer-rollers, the traveling direction of the roller arm is coincident with the feeding direction of the recording medium cartridge fed by rotation of the cartridge transfer-rollers.

As a result, the linear driving operation of the roller arm and the feeding operation of the recording medium cartridge are simultaneously performed to help speed and smooth the loading/unloading operation of the recording medium cartridge performed between the carrier and each of the cartridge storage portion and the read/write portion.

When the roller arm reaches the front-end portion or the rear-end portion of the guide, the final stage of the loading operation of the recording medium cartridge into the read/write portion or into the cartridge storage portion starts. At this final stage of the loading operation, the leading one or the trailing one of the cartridge transfer-rollers each pivoted to the front-end portion or the rear-end portion of the roller arm, has its sub-engaging projection enter the front one or the rear one of the sub-guides, which sub-guides are smoothly connected with the opposite-end portions of the guide to extend in a direction substantially perpendicular to the longitudinal direction of the guide.

After that, the sub-engaging projection which enters the sub-guide is slidably driven along the sub-guide, so that the roller arm is gradually rotated on the axis of its main-engaging projection. As a result of such rotational motion of the roller arm, the leading cartridge transfer-roller separates from the side surface of the recording medium cartridge while the trailing cartridge transfer-roller projects into the transfer path of the recording medium cartridge through the sub-engaging projection separation area. As is clear from the above, the roller arm rotary driving means is constructed of the main-engaging projection, the sub-engaging projection, the sub-engaging projection separation area, the sub-guide, and the roller arm linear driving means.

In FIG. 2B which illustrates the loading operation of the recording medium cartridge into the read/write portion, when the, front sub-engaging projection pivoted to the leading one of the opposite-end portions of the roller arm is moved downward along the front sub-guide as viewed in FIG. 2B, the rear sub-engaging projection pivoted to the trailing one of the opposite-end portions of the roller arm passes through the front sub-engaging projection separation area of the guide to escape inwardly from the guide in a condition in which the main-engaging projection of the roller arm remains engaged with the guide. As a result, the roller arm itself rotates clockwise on its main-engaging projection as viewed in FIG. 2B, because the roller arm has its main-engaging projection and its front sub-engaging projection slidably engaged with the guide and the front sub-guide, respectively.

In other words, such clockwise rotation of the roller arm itself on its main-engaging projection is accomplished through a so-called "two-point support" for the roller arm, so that the rear sub-engaging projection of the roller arm is inwardly projected into the transfer path of the recording medium cartridge, whereby the rear cartridge transfer-roller coaxially mounted on the rear sub-engaging projection of the roller arm is brought into direct contact with the rear-end portion of the recording medium cartridge, which enables the rear cartridge transfer-roller to positively push or load the cartridge into the read/write portion.

Consequently, it is possible to smoothly transfer the recording medium cartridge from the carrier to the read/write portion (or to the cartridge storage portion) so as to have the cartridge smoothly loaded into the read/write portion (or into the cartridge storage portion), without fail even when the recording medium cartridge is soiled, and/or even when the cartridge transfer-rollers have worn.

Preferably, the connection portion through which the guide has each of its opposite-end portions connected with each of the sub-guides assumes a rounded shape, preferably, a substantially circularly-curved shape.

Due to such provision of a curved connection portion between the guide and each of the sub-guides, it is possible for the sub-engaging projections received in the guide to smoothly enter each of the sub-guides. This makes it possible for the roller arm to smoothly transfer from its linear motion to its rotational motion.

Further, preferably: the guide extends substantially over the entire length of the recording medium cartridge in the loading/unloading direction thereof on the carrier; and, both the sub-engaging projection separation area and the sub-guide are provided in each of the front-end portion and the rear-end portion of the guide.

Due the above construction, it is possible to rotate the roller arm on its main-engaging projection in each of the opposite-end portions of the carrier, and therefore possible to perform the loading operation of the recording medium cartridge into the read/write potion or into the cartridge storage portion, without fail. Consequently, it is possible to have the read/write portion oppositely disposed from the cartridge storage portion through the carrier disposed therebetween, which improves both the cartridge storage portion and the read/write portion in design freedom with respect to their arrangements.

Furthermore, at the final stage of the loading operation of the recording medium cartridge into the read/write portion or into the cartridge storage portion, the roller arm rotary driving means constructed of the main-engaging projection, the sub-engaging projection, the sub-engaging projection separation area, the sub-guide, and the roller arm linear driving means is actuated to rotary drive the roller arm itself on its center pin (main-engaging projection). Due to this, the trailing end cartridge transfer-roller or the leading end cartridge transfer-roller both pivoted to the opposite-end portions of the roller arm is brought into direct contact with the rear-end portion or the front-end portion of the recording medium cartridge, and positively pushes the recording medium cartridge forward or rearward so as to load the cartridge into the read/write portion or into the cartridge storage portion. Consequently, it is possible to completely solve the problems inherent in the loading operation of the recording medium cartridge performed in the conventional apparatuses.

As described above, in the case where the loading/unloading operation of the recording medium cartridge is performed in each of the opposite-end portions of the carrier, preferably: the home position of the roller arm is set at the central portion of the guide; and, a ratio in diameter between each of the cartridge transfer-rollers and each of the gears is designed in a manner such that a feed amount of the recording medium cartridge transferred forward or rearward via the cartridge transfer-rollers reaches substantially half the entire length of the recording medium cartridge before the roller arm transferred from its home position reaches the front-end portion or the rear-end portion of the guide.

On an other hand, in a case where the transfer-roller rotary driving means is constructed of the rack and the gears (which mesh with the rack, and is integrally formed with the cartridge transfer-roller), it is possible to control a ratio in feed amount of the recording medium cartridge between the roller arm linear driving means and the transfer-roller rotary driving means by controlling a ratio in diameter between each of the cartridge transfer-rollers and each of the gears of the cartridge transfer-rollers.

Further, in the above construction, the recording medium is steadily positioned at its home position after received in the its carrier. When the roller arm reaches the end portion of the guide, the feeding operation of the recording medium cartridge performed by the cartridge transfer-rollers is completed. At the same time, the rear-end portion or the front-end portion of the recording medium cartridge passes over the trailing end cartridge transfer-roller or over the leading end cartridge transfer-roller. This makes it possible to project the trailing end cartridge transfer-roller or the leading end cartridge transfer-roller inwardly into the transfer path of the recording medium cartridge upon rotation of the roller arm itself performed by the roller arm rotary driving means, and also makes it possible to positively push the rear-end portion or the front-end portion of the recording medium cartridge forward or rearward so as to load the cartridge into the read/write portion or into the cartridge storage portion, without fail.

In the above construction, preferably: provided in only one of the opposite-side portions of the carrier are the guide, the rack, the pair of the cartridge transfer-rollers, the roller arm, the sub-engaging projection separation recesses, and the sub-guides; and, provided in the other of the opposite-side portions of the carrier is the row of the plurality of rollers which cooperate with the cartridge transfer-rollers to sandwich the recording medium cartridge therebetween and transfer the cartridge forward or rearward.

At the final stage of the loading operation of the recording medium cartridge into the read/write portion or into the cartridge storage portion, since the rear-end portion or the front-end portion of the recording medium cartridge is directly pushed forward or rearward by the trailing end cartridge transfer-roller or the leading end cartridge transfer-roller, it is possible to perform the loading operation of the recording medium cartridge by using the above-mentioned components of the recording medium library apparatus of the present invention, wherein the components are disposed only one of the opposite-side portions of the carrier, and include: the guide, the rack, the pair of the cartridge transfer-rollers, the roller arm, the sub-engaging projection separation recesses, the sub-guides, and a like.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to accompanying drawings.

Figure 1A:
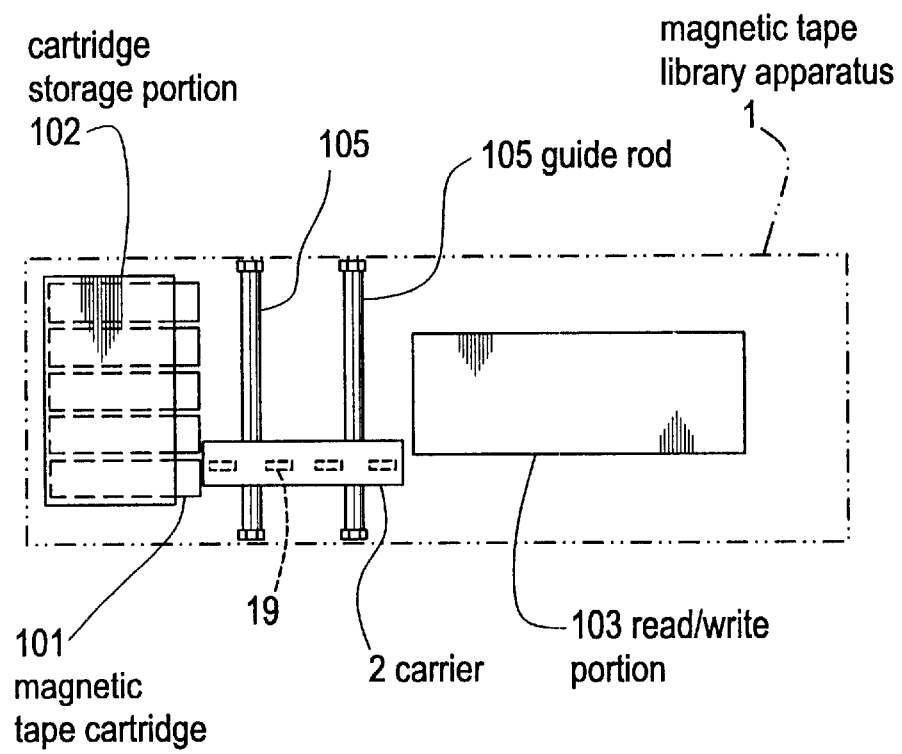
FIG. 1A is a side view of a recording medium library apparatus of an embodiment of the present invention.
Figure 1B:
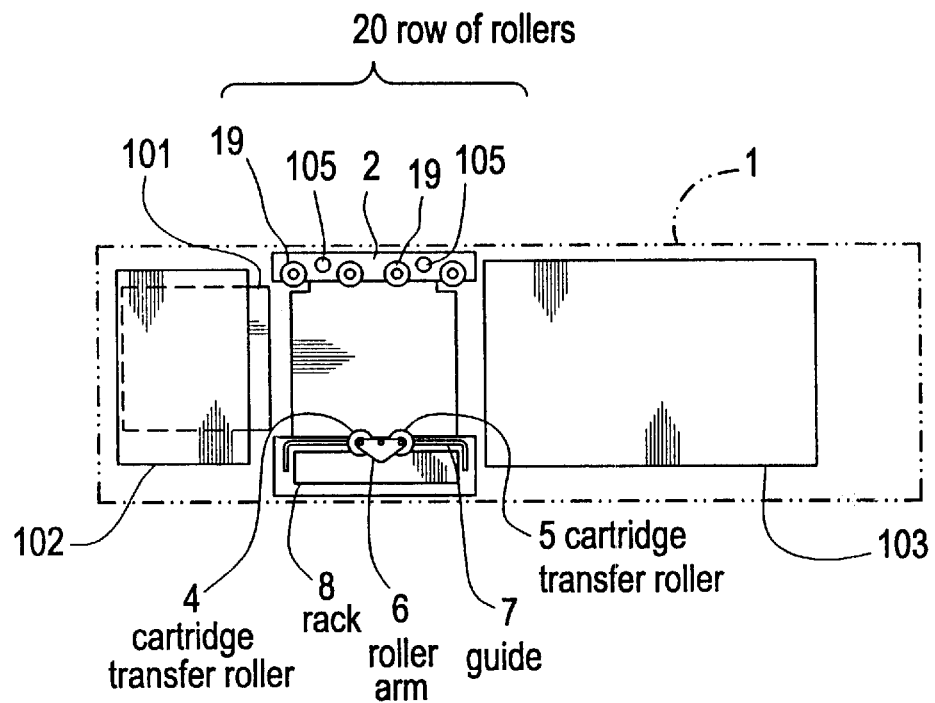
FIG. 1B is a plan view of the recording medium library apparatus shown in FIG. 1A.

FIG. 1A shows a side view of the magnetic tape library apparatus 1 according to an embodiment of the present invention and, FIG. 1B shows a plan view of the magnetic tape library apparatus 1 shown in FIG. 1A.

As shown in FIG. 1A, the magnetic tape library apparatus 1 is provided with: a cartridge storage portion 102 for storing a magnetic tape cartridge 101 therein; a read/write portion 103 for reading/writing data from/to the magnetic tape cartridge 101; and, a carrier 2 which is reciprocally moved between the cartridge storage portion 102 and the read/write portion 103 in a condition in which the carrier 2 holds the magnetic tape cartridge 101 therein. The carrier 2 is movably mounted in the magnetic tape library apparatus 1 in a manner such that the carrier 2 is slidably moved up and down by means of a suitable elevator mechanism (not shown) along a pair of guide rods 105 (shown in FIG. 1A), and freely transferred between: its uppermost position corresponding to an uppermost one of cells (not labeled) of the cartridge storage portion 102; and, its lowermost position corresponding to a lowermost one of the cells (not labeled) of the cartridge storage portion 102.

Figure 9A:
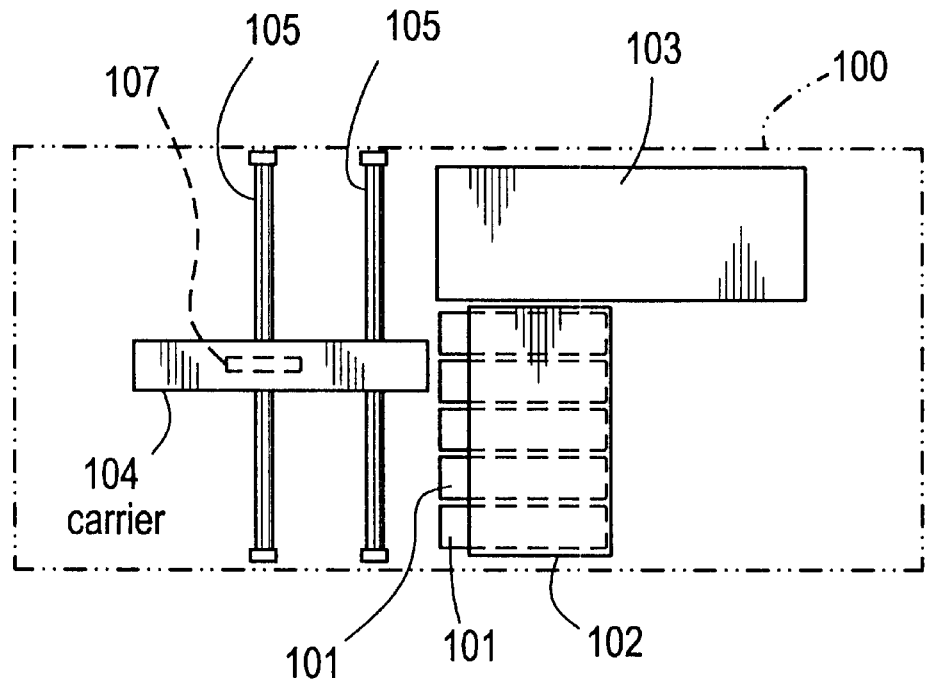
FIG. 9A is a side view of a first conventional recording medium library provided with a carrier having a tape cartridge loading/unloading mechanism in which a pickup hand is used.
Figure 9B:
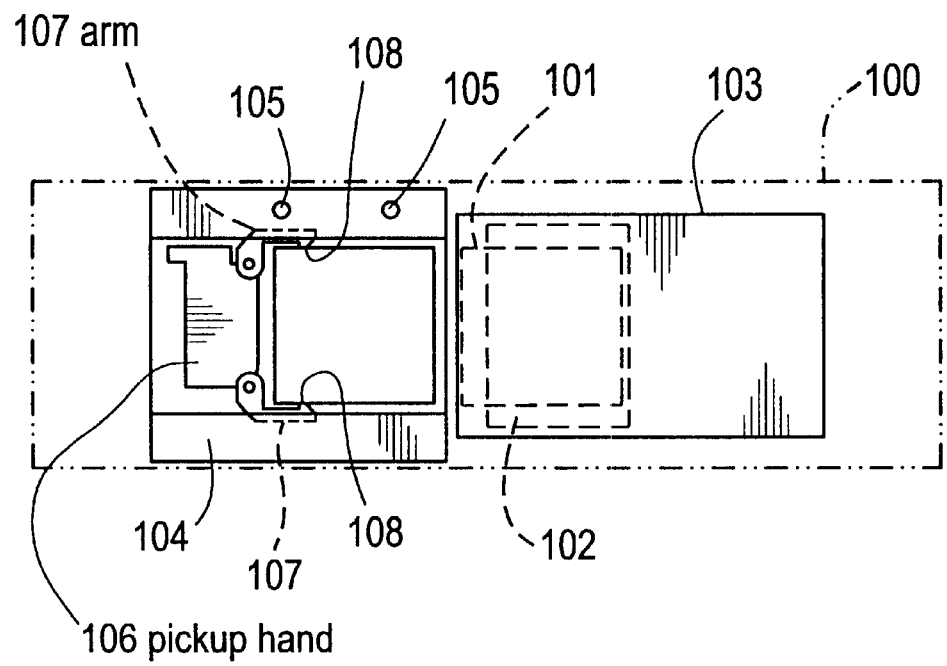
FIG. 9B is a plan view of the first conventional recording medium library apparatus shown in FIG. 9A, illustrating the pickup hand used in the tape cartridge loading/unloading mechanism of the first conventional recording medium library apparatus.

Incidentally, in this embodiment, as shown in FIG. 1A, the read/write portion 103 is oppositely disposed from the cartridge storage portion 102 through the carrier 2 disposed therebetween. However, it is also possible to vertically pack the read/write portion 103 and the cartridge storage portion 102 together in a stack in one of opposite-end portions of the carrier 2, as is a conventional apparatus 100 shown in FIGS. 9A and 9B.

Figure 10A:
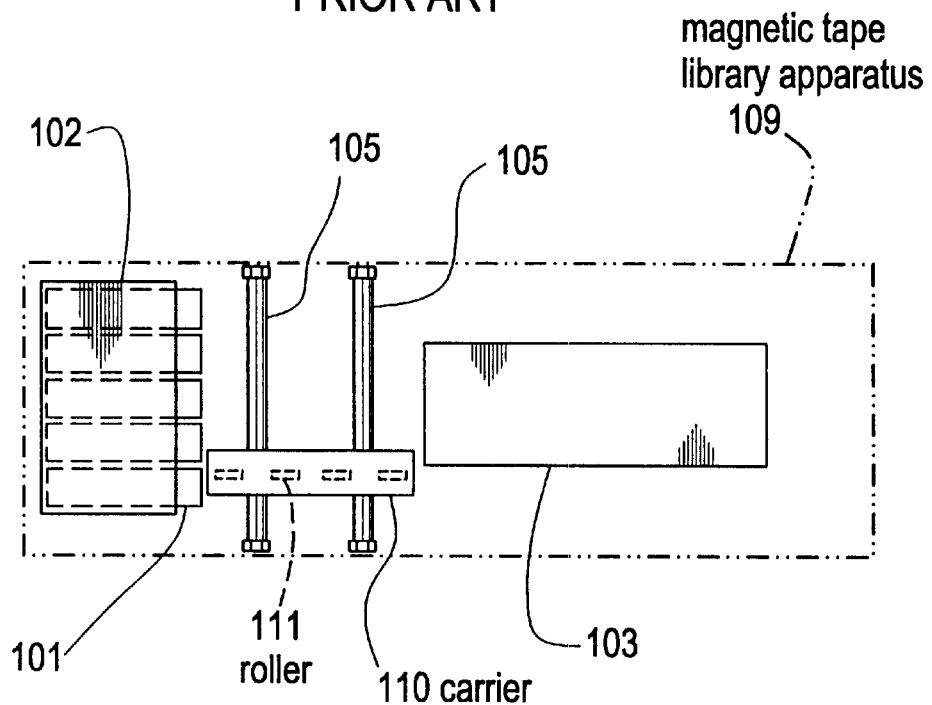
FIG. 10A is a side view of a second conventional recording medium library apparatus, illustrating a carrier provided with a tape cartridge loading/unloading mechanism in which two rows of rollers serve as means for transferring a magnetic tape cartridge.
Figure 10B:
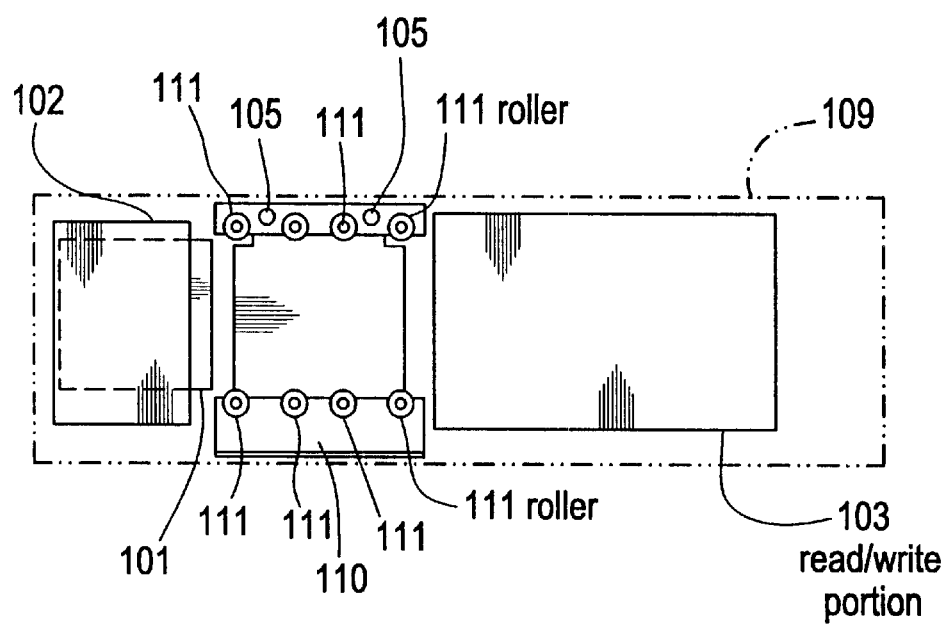
FIG. 10B is a plan view of the second conventional recording medium library apparatus shown in FIG. 10A, illustrating the carrier provided with the tape cartridge loading/unloading mechanism in which two rows of rollers serve as the means for transferring the magnetic tape cartridge.

There is substantially no difference in construction between an other conventional apparatus 100 (shown in FIGS. 10A and 10B) and the magnetic tape library apparatus 1 of the present invention (shown in FIGS. 1A and 1B) with respect to each of the magnetic tape cartridge 101, the cartridge storage portion 102, the read/write portion 103, the guide rods 105, and the elevator mechanism for vertically moving the carrier 2 up and down.

Figure 2A:
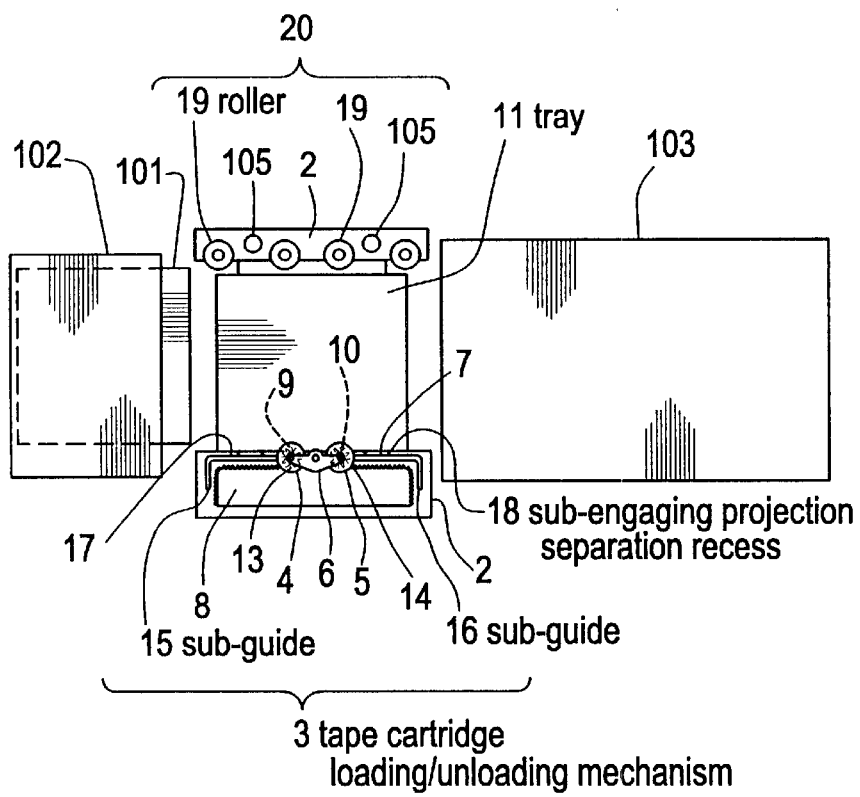
FIG. 2A is an enlarged plan view of the recording medium library apparatus shown in FIG. 1A.

FIG. 2A shows an enlarged plan view of the magnetic tape library apparatus 1, exposing a tape cartridge loading/unloading mechanism 3 by removing the carrier 2 from the magnetic tape library apparatus 1.

Figure 2B:
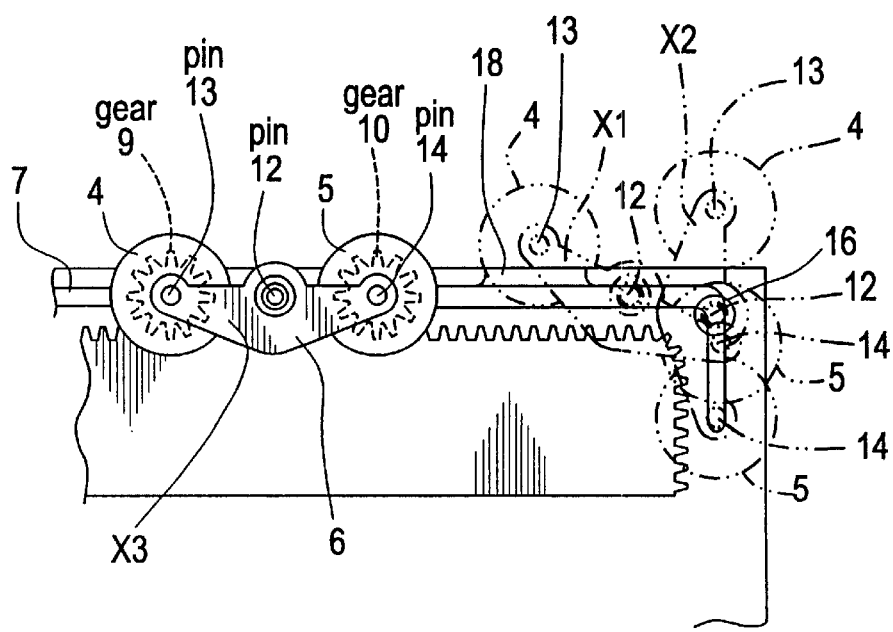
FIG. 2B is an enlarged view of essential parts of a guide and like components of the recording medium library apparatus shown in FIG. 1A.

As is clear from FIG. 2A, the tape cartridge loading/unloading mechanism 3 is substantially constructed of: a pair of cartridge transfer-rollers 4, 5; a roller arm 6 having each of the cartridge transfer-rollers 4, 5 pivoted to each of its opposite-end portions; a guide 7 constructed of a groove; a rack 8 which is disposed adjacent to a groove of the guid 7, and extends in parallel to the groove of the guid 7 in an area outer than the groove of the guid 7 with respect to a tray 11 of the carrier 2 (shown in FIG. 2A); and, a pair of gears 9 and 10 which are integrally formed with the cartridge transfer-rollers 4 and 5, respectively, wherein each of the gears 9, 10 is integrally provided in a lower surface of each of the cartridge transfer-rollers 4, 5 as shown in dotted lines in its plan view in FIG. 2B, and meshes with the rack 8.

Figure 6A:
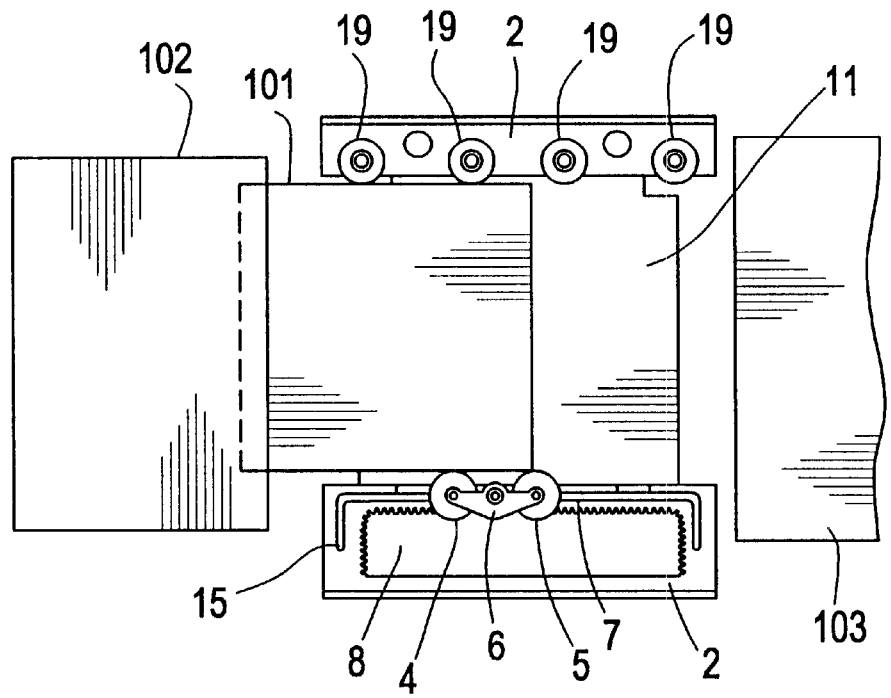
FIGS. 6A and 6B are plan views of the recording medium library apparatus shown in FIG. 1A, illustrating a final stage of the retrieving operation of the magnetic tape cartridge from the cartridge storage portion and the transfer operation of the cartridge, respectively.
Figure 6B:
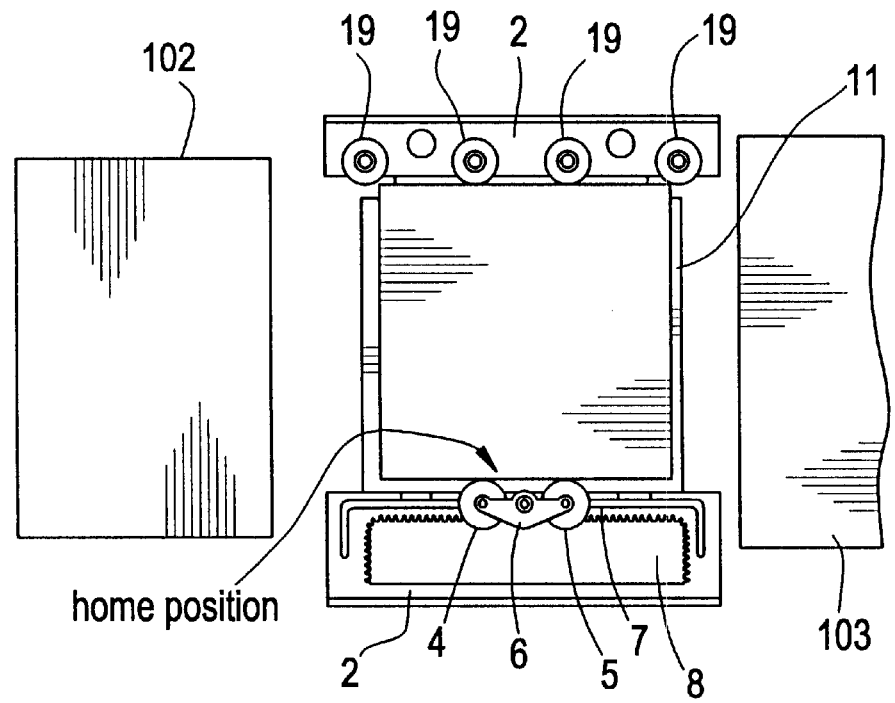

In the above construction, as shown in FIG. 6B, the cartridge transfer-rollers 4, 5 are disposed adjacent to a side surface of the magnetic tape cartridge 101 having been received on the tray 11 of the carrier 2, and spaced a predetermined distance away from each other in a loading/unloading direction of the magnetic tape cartridge 101 into the read/write portion 103 or into the cartridge storage portion 102. As is clear from FIG. 2B, a leading one cartridge transfer-roller 5 of the cartridge transfer-rollers 4, 5 is pivoted to a leading one of the opposite-end portions of the roller arm 6. On an other hand, a trailing one cartridge transfer-roller 4 of the cartridge transfer-rollers 4, 5 is pivoted to a trailing one of the opposite-end portions of the roller arm 6.

Figure 3A:
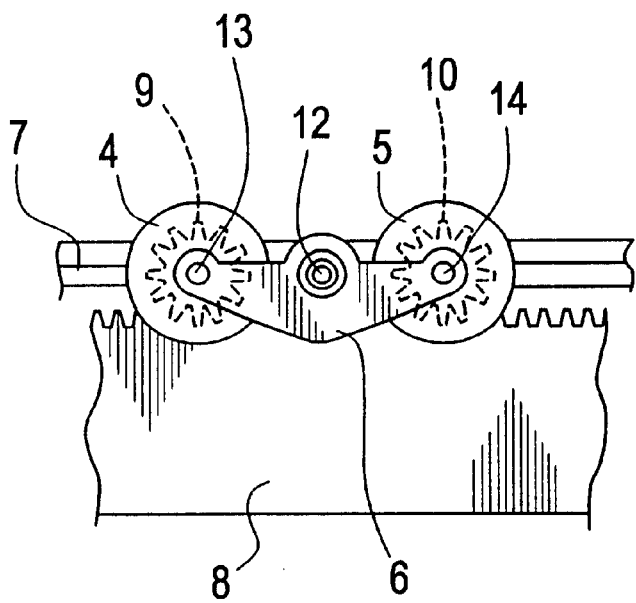
FIG. 3A is an enlarged plan view of a rack and gears meshed with the rack, both of which are used in the recording medium library apparatus shown in FIG. 1A, illustrating their meshed condition.
Figure 3B:
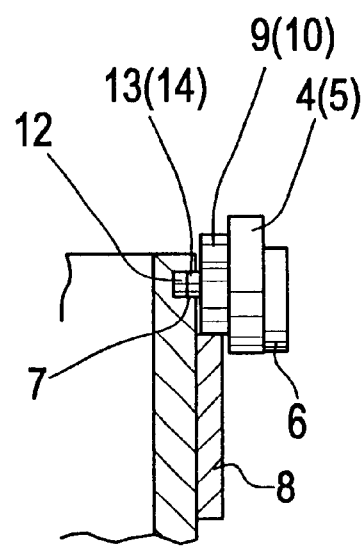
FIG. 3B is an enlarged side elevational view of the rack and the gears meshed with the rack, both of which are used in the recording medium library apparatus shown in FIG. 1A, illustrating their meshed condition.

As shown in FIG. 3B, a center pin 12 is fixedly mounted in a central portion of the roller arm 6, and projects downward into the groove of the guide 7 to form a main-engaging projection of the roller arm 6. Incidentally, in FIG. 3B, the center pin 12 is shown as if it projects to the left. In the loading/unloading operation of the magnetic tape cartridge 101, the center pin 12 is slidably moved along the guide 7 to guide the roller arm 6 in its linear motion along the guide 7. As shown in FIG. 1B, the guide 7 extends substantially over an entire length of the carrier 2 in the loading/unloading direction of the magnetic tape cartridge 101.

Further, as is clear from FIG. 3B, the gears 9 and 10, which are integrally formed with the lower surface of the cartridge transfer-roller 4 and the lower surface of the cartridge transfer-roller 5, respectively, are slightly smaller in diameter than the cartridge transfer-rollers 4 and 5, respectively. On the other hand, as shown in FIG. 2B, pins 13 and 14 are pivoted to a trailing one and a leading one of the opposite-end portions of the roller arm 6, respectively, to form a rear pin 13 and a front pin 14, respectively. Further, a lower end of each of these pins 13, 14 projects downward, and slightly exceeds a lower surface of each of the gears 9, 10 to form a sub-engaging projection which slidably enters the groove of the guide 7.

As described above, the lower end portion of each of the pins 13, 14 form the sub-engaging projection. This projection is slidably received in the guide 7 together with the main-engaging projection constructed of the center pin 12. However, as shown in dotted lines in FIG. 3B, each of the pins 13, 14 is slightly shorter in entire length than the center pin 12, and therefore slightly shorter in engaging depth with the guide 7 than the center pin 12.

As shown in FIG. 3B, the rack 8 is disposed adjacent to the gears 9, 10 of the cartridge transfer-rollers 4, 5 so as to properly mesh with them without fail. On the other hand, the cartridge transfer-rollers 4, 5 are pivoted to the opposite-end portions of the roller arm 6 which has its center pin 12 (main-engaging projection) slidably received in the guide 7 and guided thereby.

Although a roller arm linear driving means for linear driving the roller arm 6 through its center pin 12 (main-engaging projection of the roller arm 6) is not shown in its detailed construction in the drawings, it is possible to readily construct such roller arm linear driving means, for example, by using a feed screw (not shown), wherein: the feed screw extends in parallel with the guide 7 in a space under the tray 11 of the carrier 2; and, a front-end portion of the center pin 12 is slidably engaged with a flute-like groove defined adjacent ones of threads of the feed screw which is rotary driven by a motor or the like. It is also natural for the roller arm linear driving means to employ another construction in which: a pair of pulleys (not shown) are disposed in a space under the tray 11 so as to be located adjacent to the opposite-end portions of the tray 11; a timing belt (not shown) is so arranged as to run round these pulleys; a connecting pin (not shown) such as the center pin 12 has its front-end portion fixed to a desired portion of the timing belt; and, one of the pulleys is rotary driven clockwise or counterclockwise by a motor or a like to drive the connecting pin such as the center pin 12.

Incidentally, preferably, this roller arm linear driving means is provided with a position detecting sensor for detecting a position of the center pin 12 (that is, a position of the roller arm 6) in the loading/unloading operation of the magnetic tape cartridge 101.

The easiest way to realize the above-mentioned position detecting sensor is to provide a suitable position detecting sensor in any one of: each of opposite-end positions of a stroke path of the center pin 12; and, a center position of such stroke path, wherein the sensor provided in the center position of the stroke path forms a home position detecting sensor for detecting a home position of the center pin 12, which position is identical with a home position of the roller arm 6, and the sensor provided in each of the opposite end positions of the stroke path forms a limit sensor for detecting each of the opposite-end positions of the stroke path of the, center pin 12 during the loading/unloading operation of the magnetic tape cartridge 101. In the case where the roller arm linear driving means described above employs the construction in which the motor or like is employed together with the feed screw or with the timing belt, it is possible to provide a suitable pulse coder in any one of the motor, the feed screw and the pulleys, and thereby forming an absolute encoder or forming an incremental encoder to detect the position of the center pin 12 or the position of the roller arm 6 in the loading/unloading operation of the magnetic tape cartridge 101.

As shown in FIG. 2A, a pair of sub-guides 15, 16 are provided in the opposite-end portions of the guide 7 to form extension portions of the guide 7. These extension portions (that is, sub-guides 15, 16) extend outward in a direction perpendicular to a length of the guide 7. In other words, each of the sub-guides 15, 16 is identical in width with the guide 7 and smoothly connected therewith through a rounded connection portion. This rounded connection portion assumes a substantially circularly-curved shape, and is most clearly shown in FIG. 2B.

Further, as shown in FIG. 2A, a pair of sub-engaging projection separation (recesses) 17, 18 are identical in construction with each other. These projection separation recesses 17, 18 are formed in the opposite-end portions of the guide 7 so as to be substantially symmetrically arranged with respect to the home position of the roller arm 6. Through these sub-engaging projection separation recesses 17, 18, the guide 7 is opened to a transfer path of the magnetic tape cartridge 101, as partially shown in FIG. 2B. Incidentally, in the vicinity of each of the opposite-end portions of the guide 7, an upper surface of the tray 11 is slightly lower in level (height) than the transfer path of the magnetic tape cartridge 101. As is clear from FIGS. 2A and 3B, a depth of each of the sub-engaging projection separation recesses 17, 18 is so designed as to permit only the pins 13, 14 (sub-engaging projections of the roller arm 6) to pass over the sub-engaging projection separation recesses 17, 18, and thereby escaping (upward as viewed in FIGS. 2A and 2B) from the guide 7 into the transfer path of the magnetic tape cartridge 101. In other words, the depth of each of the sub-engaging projection separation recesses 17, 18 prevents the center pin 12 (main-engaging projection of the roller arm 6) from passing over these sub-engaging projection separation recesses 17, 18.

As shown in FIGS. 2A and 1B, a row 20 of a plurality of rollers 19 is oppositely disposed from the cartridge transfer-rollers 4, 5 through the carrier 2 provided with the guide 7. In other words, the cartridge transfer-rollers 4, 5 are disposed in one of the opposite-side portions of the carrier 2, while the row 20 of the rollers 19 is disposed in the other of the opposite-side portions of the carrier 2. Consequently, the magnetic tape cartridge 101 received in the carrier 2 is sandwiched between the cartridge transfer-rollers 4, 5 and the row 20 of the rollers 19, as shown in FIG. 6B.

Each of the rollers 19 is synchronized in rotational speed with each of the cartridge transfer-rollers 4, 5, but rotates in a direction counter to the rotational direction of each of the cartridge transfer-rollers 4, 5.

The loading operation of the magnetic tape cartridge 101 into the read/write portion 103 or into the cartridge storage portion 102 is performed by pushing the magnetic tape cartridge 101 thereinto, as is in the conventional apparatuses.

In other words, in loading- the magnetic tape cartridge 101 into the read/write portion 103 or into the cartridge storage portion 102, when the magnetic tape cartridge 101 is intensely pushed into a loading opening of the read/write portion 103 or of the cartridge storage portion 102, the magnetic tape cartridge 101 is automatically locked up in the read/write portion 103 or in the cartridge storage portion 102 after completion of its loading operation, and is held in its loaded position in read/write portion 103 or in the cartridge storage portion 102, wherein each of the read/write portion 103 and the cartridge storage portion 102 functions to lock up the magnetic tape cartridge 101 therein.

On the other hand, in the case where the magnetic tape cartridge 101 is unloaded from the read/write portion 103 or from the cartridge storage portion 102, the magnetic tape cartridge 101 is initially pushed intensely into the read/write portion 103 or into the cartridge storage portion 102 to unlock the magnetic tape cartridge 101 from the read/write portion 103 or from the cartridge storage portion 102. As a result, the magnetic tape cartridge 101 thus unlocked is automatically ejected outward from its locked position.

Now, with reference to the above construction, the tape cartridge loading/unloading mechanism 3 of the magnetic tape library apparatus 1 will be briefly described with respect to: an unloading operation for retrieving the magnetic tape cartridge 101 from the cartridge storage portion 102; and, a loading operation for inserting the thus retrieved magnetic tape cartridge 101 into the read/write portion 103.

Figure 4A:
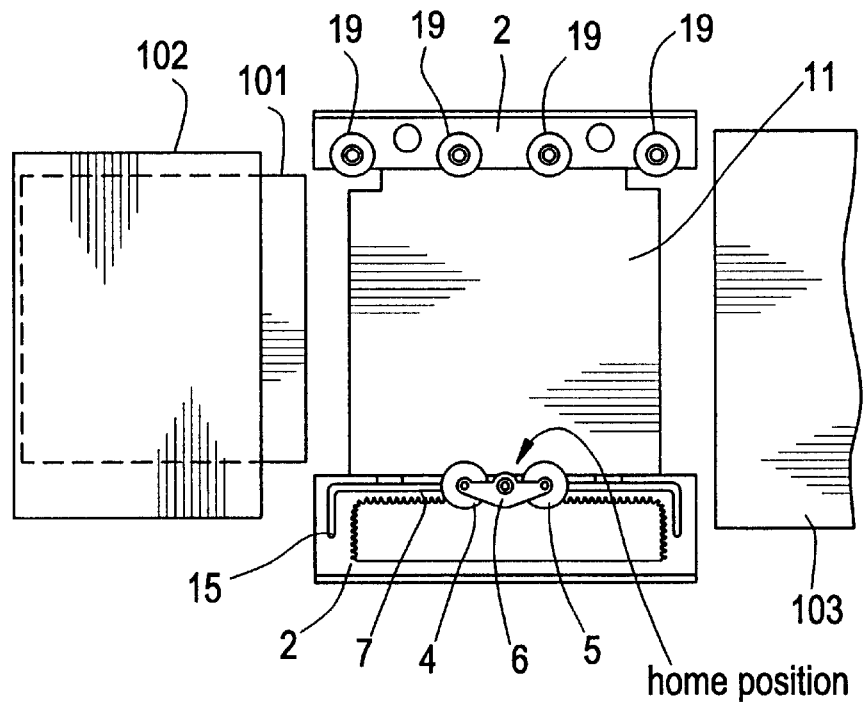
FIGS. 4A and 4B are plan views of the recording medium library apparatus shown in FIG. 1A, illustrating the roller arm located in a central portion of a carrier and the roller arm located in a rear-end portion of the carrier, respectively.

FIG. 4A shows an initial state of the tape cartridge loading/unloading mechanism 3. In this initial state: the rollers arm 6 is positioned at its home position which is a center of the stroke path of the center pin 12 (which forms the main-engaging projection of the roller arm 6 shown in FIG. 2B), wherein a length of such stroke path is determined by a length of the guide 7; and, the magnetic tape cartridge 101 is still not received on the tray 11 of the carrier 2.

As described above, in the loading/unloading operation of the magnetic tape cartridge 101, a position of the roller arm 6 which travels from its home position to each of the opposite-end positions of the stroke path of the center pin 12 (main-engaging projection of the roller arm 6) is detected using the above-mentioned roller arm linear driving means provided with the position detecting sensor for detecting the position of the center pin 12.

In the unloading operation of the magnetic tape cartridge 101 from the cartridge storage portion 102, first, the above-mentioned elevator mechanism (not shown) is actuated, so that the carrier 2 is slidably moved up and down along the pair of the guide rods 105 (shown in FIG. 1A) to reach a target cell of the cartridge storage portion 102, in which cell a target magnetic tape cartridge 101 is contained.

As described above, when the carrier 2 reaches a level (height) of the target cell, the above-mentioned roller arm linear driving means is actuated so that the roller arm 6 is linear driven from its home position to one of the opposite-end positions of the stroke path, which one is in the side of the cartridge storage portion 102.

On the other hand, as shown in FIGS. 2A and 3A, the gears 9 and 10 are fixed to the cartridge transfer-rollers 4 and 5, respectively. Further, these gears 9, 10 mesh with the rack 8. Consequently, when the roller arm 6 is linear driven along the guide 7, the cartridge transfer-rollers 4, 5 are rotary driven by the rack 8. At this time, however, since any magnetic tape cartridge 101 is still not received on the tray 11 of the carrier 2, these cartridge transfer-rollers 4, 5 thus rotary driven have no effect on the magnetic tape cartridge 101. Further, although each of the rollers 19 in the row 20 is also rotary driven at this time, these rollers 19 also have no effect on the magnetic tape cartridge 101 as is in the case of each of the cartridge transfer-rollers 4, 5 since any magnetic tape cartridge 101 is still not received on the tray 11 of the carrier 2. Incidentally, at this time, each of the cartridge transfer-rollers 4, 5 is rotated counterclockwise as viewed in FIG. 4A. On the other hand, each of the rollers 19 in the row 20 is rotated clockwise as viewed in FIG. 4A.

Figure 4B:
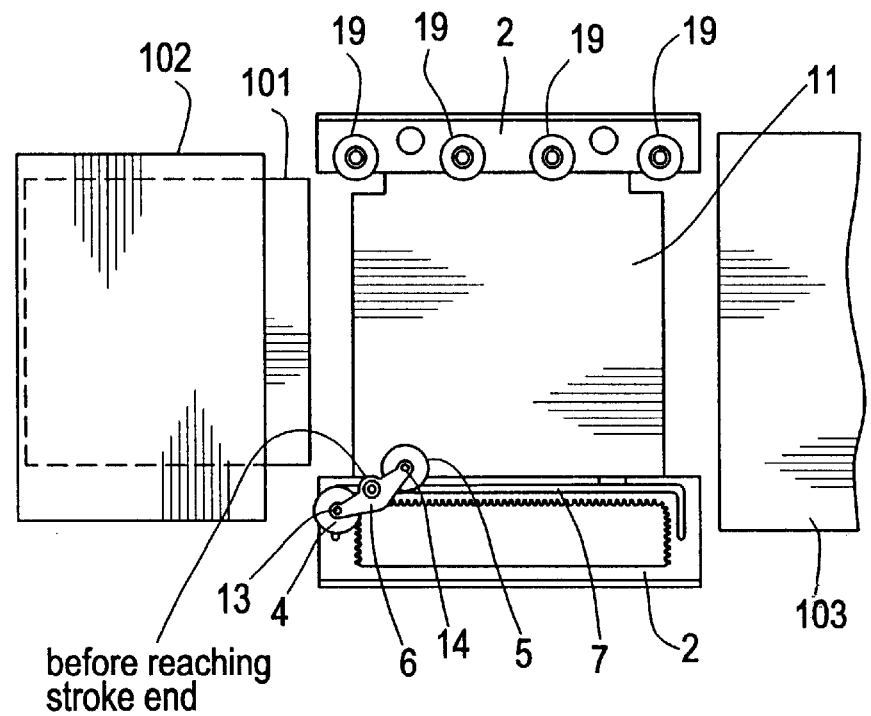

FIG. 4B shows the roller arm 6, the center pin 12 of which is guided by the guide 7 and approaches the end position of its stroke path in the side of the cartridge storage portion 102.

As described above, when the center pin 12 (main-engaging projection) of the roller arm 6 reaches the above end position of the stroke path, a rear one the cartridge transfer-roller 4 of the cartridge transfer-rollers 4, 5 as viewed in FIG. 4B has its sub-engaging projection 13 enter a rear one the sub-guide 15 of the sub-guides 15, 16 which forms the extensions of the guide 7. After that, this rear sub-engaging projection 13 moves outward along the rear sub-guide 15. Incidentally, as is clear from FIG. 4A, since the connection portion between the guide 7 and the rear sub-guide 15 is rounded in shape, it is possible for the rear sub-engaging projection 13 to smoothly transfer from the guide 7 to the rear sub-guide 15.

As a result, the roller arm 6 is rotary driven on its center pin 12 counterclockwise (as viewed in FIG. 4B) in a manner such that the rear one the cartridge transfer-roller 4 and the front one the cartridge transfer-roller 5 of the cartridge transfer-rollers 4, 5 are swung outward and inward, respectively, with respect to the guide 7, as viewed in FIG. 4B.

As for inward swinging motion of the front cartridge transfer-roller 5 as shown in FIG. 4B, a rear sub-engaging projection separation recess 17 (shown in FIG. 2A) is formed in the vicinity of the rear-end position of the stroke path of the center pin 12 in the side of the cartridge storage portion 102. Consequently, it is possible for the front sub-engaging projection 14 to escape inward from the guide 7 through the rear sub-engaging projection separation recess 17. Due to this, a rotational motion of the roller arm 6 itself on its center pin 12 is accomplished through a so-called "two-point support" for the roller arm 6. More specifically, this two-point support for the roller arm 6 is realized by the provisions of the pins 12, 13, the guide 7 and the rear sub-engaging projection separation recess 17. wherein the pin 13 forms the rear sub-engaging projection of the roller arm 6 and is pivoted to a rear one of the opposite-end portions of the roller arm 6. In the above construction, therefore, there is no danger that the front sub-engaging projection 14 interferes with the guide 7.

Consequently, at the above stage of the loading operation of the magnetic tape cartridge 101 into the cartridge storage portion 102, the roller arm rotary driving means is constructed of: the center pin 12 forming the main-engaging projection of the roller arm 6; the rear-pin 13 forming the rear sub-engaging projection of the roller arm 6; the rear sub-engaging projection separation recess 17 through which the front pin 14 escapes inward from the guide 7, as viewed in FIG. 4B; the rear sub-guide 15; and, the roller arm linear driving means.

Figure 5A:
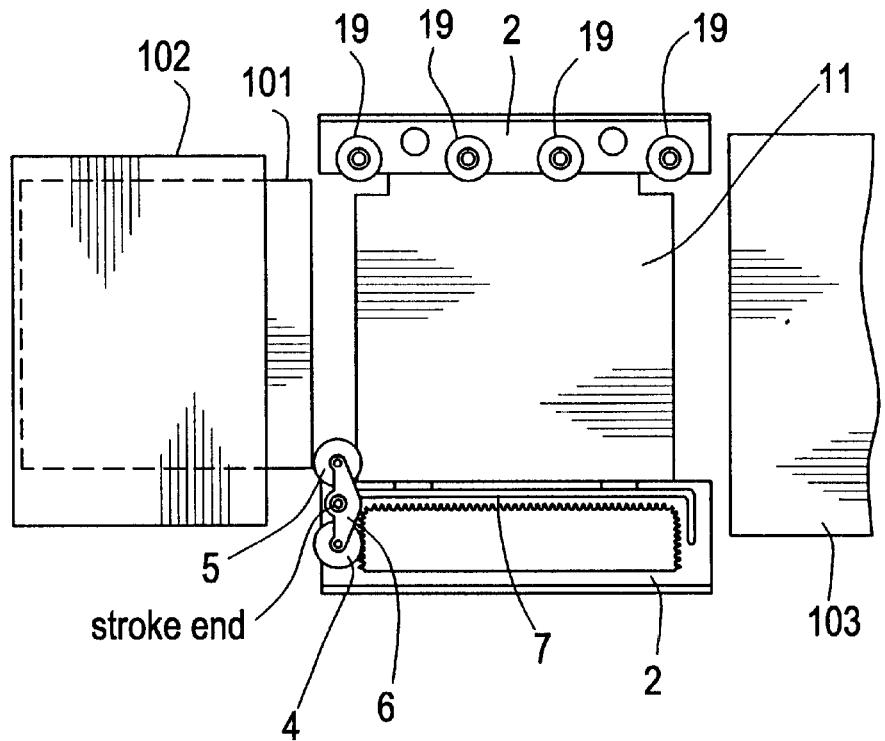
FIGS. 5A and 5B are plan views of the recording medium library apparatus shown in FIG. 1A, illustrating an initial stage of a retrieving (unloading) operation of the magnetic tape cartridge or illustrating a final stage of an inserting (loading) operation of the magnetic tape cartridge from or into a cartridge storage portion, respectively.

When the roller arm 6 reaches the rear-end position of the stroke path in the side of the cartridge storage portion 102, the roller arm 6 is further rotated to reach its vertical position as viewed in FIG. 5A. As a result, the rear cartridge transfer-roller 5 positively pushes back the magnetic tape cartridge 101 to the left (as viewed in FIG. 5A) so as to further insert the magnetic tape cartridge 101 into the cartridge storage portion 102.

Due to the above pushing back operation, the magnetic tape cartridge 101 locked in the cartridge storage portion 102 is unlocked therefrom so that the thus unlocked magnetic tape cartridge 101 is ejected outward (to the right as viewed in FIG. 5A) from the cartridge storage portion 102.

Figure 5B:
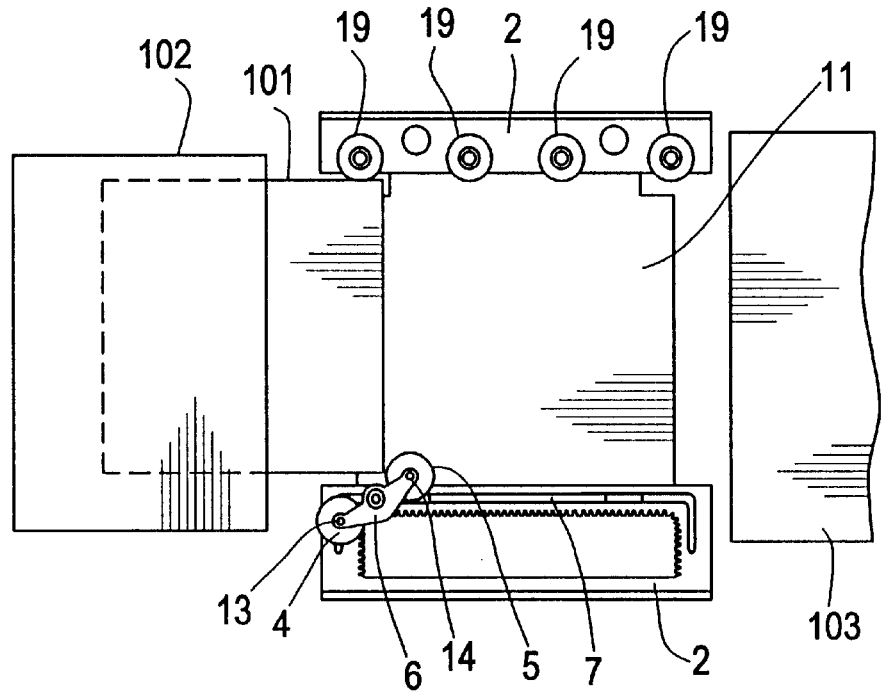

At this stage, the roller arm linear driving means begins to linear drive the roller arm 6 to the right as viewed in FIG. 5A, so that the roller arm 6 is linear driven from this end position of the stroke path back to its home position. At the same time, each of the rollers 19 in the row 20 begins to rotate in the opposite direction counter to that in which each of the rollers 19 has rotated before reaching the end position of the stroke path in the side of the cartridge storage portion 102. In other words, each of the rollers 19 is rotary driven counterclockwise, as viewed in FIG. 5B.

On the other hand, the front cartridge transfer-roller 5 is pushed forward to the right (as viewed in FIG. 5B) by a front-end surface of the magnetic tape cartridge 101 thus ejected from the cartridge storage portion 102. As a result, the roller arm 6 is rotary driven clockwise in a manner such that the front cartridge transfer-roller 5 is swung outward with respect to the carrier 2, so that the pin 13 forming the rear sub-engaging projection of the roller arm 6 is transferred from the rear sub-guide 15 back to the guide 7. Rotary mounted on the pin 13 is the rear cartridge transfer-roller 4. At the same time, as viewed in FIG. 5B, the pin 14 having escaped inward from the guide 7 through the rear sub-engaging projection separation recess 17 is also transferred from the transfer path of the magnetic tape cartridge 101 on the tray 11 back to the guide 7.

As a result, as shown in FIG. 6B, the magnetic tape cartridge 101 thus ejected in the above is sandwiched in its opposite-side surfaces between the cartridge transfer-rollers 4, 5 and the rollers 19 of the row 20 disposed in the other of the opposite-side portions of the carrier 2.

Figure 3C:
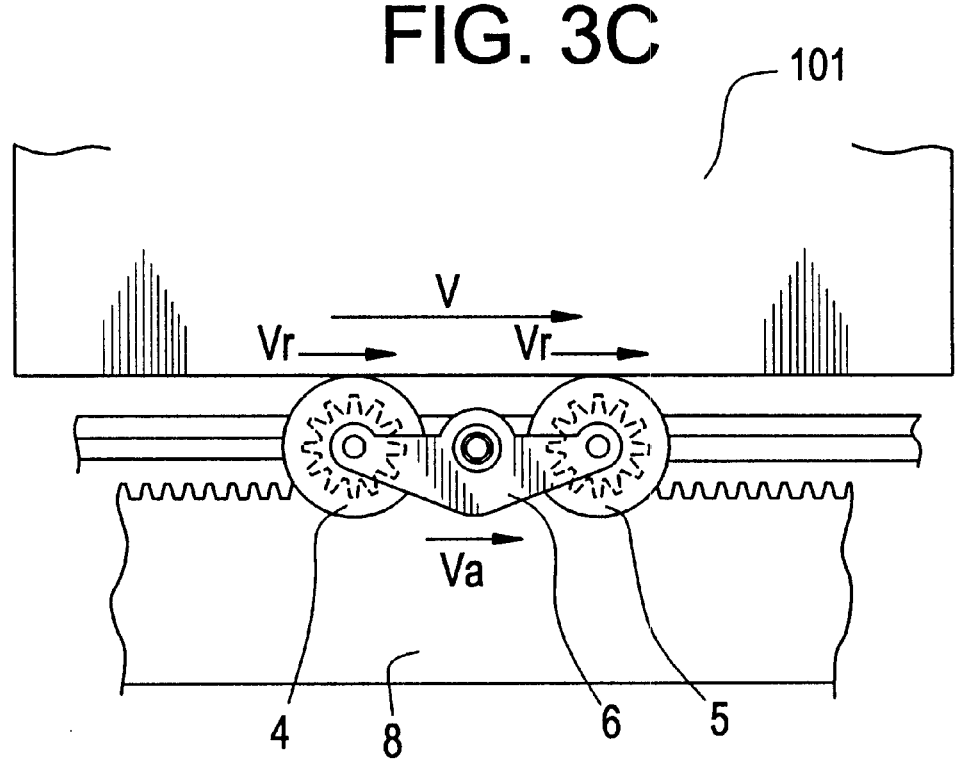
FIG. 3C is an enlarged plan view of the rack and the gears meshed with the rack, both shown in FIG. 1A, illustrating a transfer operation of a magnetic tape cartridge performed by a roller arm with aid of cartridge transfer-rollers.

At this time, the roller arm 6 is linear driven by the roller arm linear driving means so as to be transferred from the end position of the stroke path in the side of the cartridge storage portion 102 to its home position. As shown in FIGS. 2A, 3A and 3C, the gears 9 and 10 are fixed to the cartridge transfer-rollers 4 and 5, respectively, and mesh with the rack 8. On the other hand, these cartridge transfer-rollers 4, 5 are pivoted to the opposite-end portions of the roller arm 6. Due to the above construction, when the roller arm 6 is linear transferred from the side of the cartridge storage portion 102 to its home position, each of the cartridge transfer-rollers 4, 5 is rotary driven clockwise as viewed in FIG. 6A. In other words, these cartridge transfer-rollers 4, 5 are rotary driven so as to transfer the magnetic tape cartridge 101 from the side of the cartridge storage portion 102 to the home position of the roller arm 6.

More specifically, a transfer-roller rotary driving means for rotatably driving the cartridge transfer-rollers 4, 5 employed in this embodiment is constructed of: the rack 8 and the gears 9, 10 meshed with the rack 8; and, the above-mentioned roller arm linear driving means. Incidentally, all the movable components of the magnetic tape library apparatus 1 (shown in FIG. 1B), for example such as the roller arm rotary driving means and like movable components are driven by a single drive unit such as a motor or the like for driving the above-mentioned feed screw, the timing belt and the like.

As is clear from FIG. 3C, a relative transfer velocity "V" of the magnetic tape cartridge 101 with respect to the carrier 2 is equal to a sum of a linear transfer velocity "Va" of the roller arm 6 and a peripheral velocity "Vr" of each of the cartridge transfer-rollers 4, 5 pivoted to the opposite-end portions of the roller arm 6. Consequently, a peripheral velocity of each of the rollers 19 in the row 20 is equal to the relative transfer velocity "V" of the magnetic tape cartridge 101 with respect to the carrier 2.

Consequently, the magnetic tape cartridge 101 thus sandwiched between the cartridge transfer-rollers 4, 5 and the row 20 of the rollers 19 is transferred to the home position of the roller arm 6 from the end position of the stroke path in the side of the cartridge storage portion 102 a the velocity of "V" FIG. 6B shows the magnetic tape cartridge 101 which has already reached its home position.

In this embodiment, a ratio in diameter between each of the cartridge transfer-rollers 4, 5 and each of the gears 9, 10 is designed in a manner such that a feed amount of the magnetic tape cartridge 101 transferred forward via the cartridge transfer-rollers 4, 5 reaches substantially half the entire length of the magnetic tape cartridge 101 before the roller arm 6 transferred from the end position of the stroke path in the side of the cartridge storage portion 102 reaches its home position. Consequently, as shown in FIG. 6A, when the roller arm 6 reaches its home position, the center of the magnetic tape cartridge 101 in its longitudinal direction also reaches the home position of the roller arm 6.

As described above, at a time when the roller arm 6 and the magnetic tape cartridge 101 return back to the home position, the roller arm linear driving means (that is, all the roller arm 6, cartridge transfer-rollers 4, 5, and the rollers 19 in the row 20) stop their operations temporarily, so that the magnetic tape cartridge 101 is held stationary in the home position on the tray 11 of the carrier 2 for a while when the elevator mechanism is actuated to vertically move the carrier 2 up and down, and thereby positioning the carrier 2 in the same level (height) as that of the read/write portion 103.

After that, both the roller arm linear driving means and the rollers 19 of the row 20 are driven again. As a result, the magnetic tape cartridge 101 is further transferred from its home position to the other end position of the stroke path in the side of the read/write portion 103 (that is, transferred to the right, as viewed in FIG. 7A).

Figure 7A:
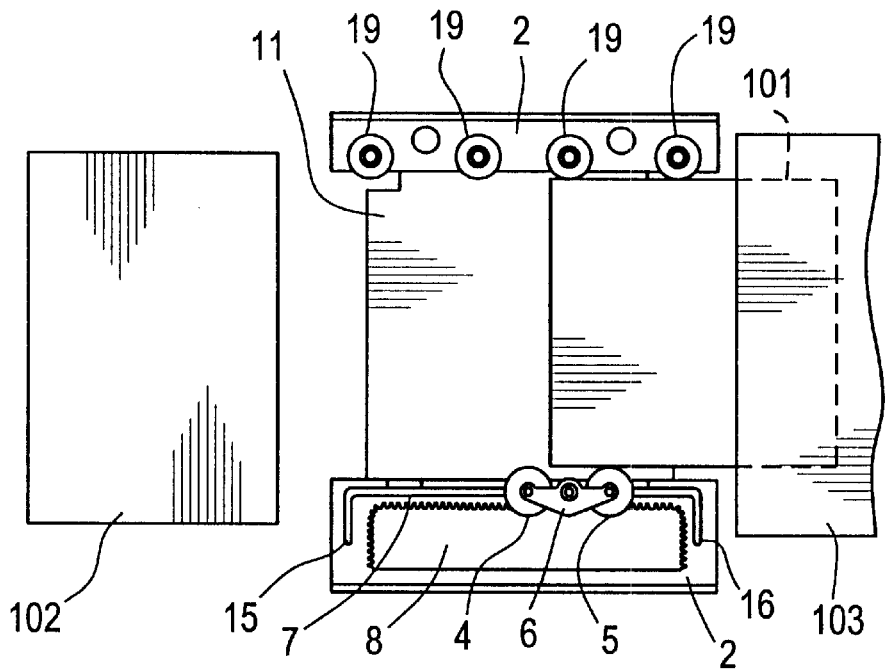
FIGS. 7A and 7B are plan views of the recording medium library apparatus shown in FIG. 1A, illustrating the initial stage and the final stage of the loading (insertion) operation of the magnetic tape cartridge into a read/write portion, respectively.
Figure 7B:
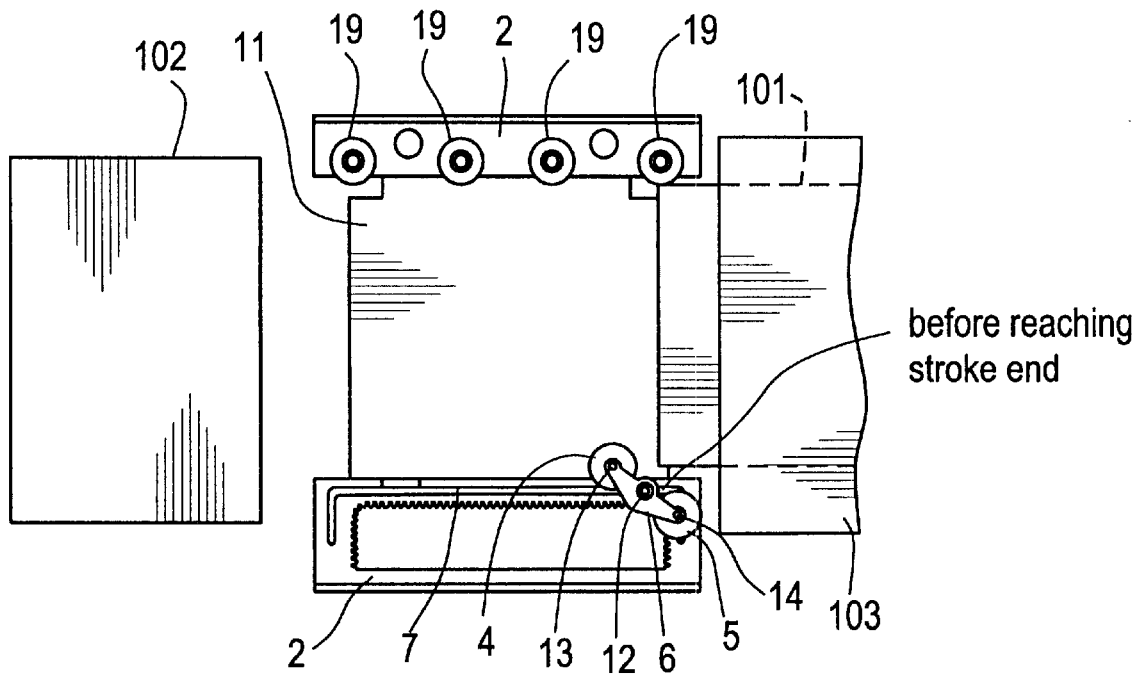

FIG. 7B shows the roller arm 6, which travels along the guide 7 before reaching the other end position of the stroke path in the side of the read/write portion 103. More specifically, the roller arm 6 reaches its oblique position shown in FIG. 7B. This oblique position of the roller arm 6 is denoted by the reference letter/numeral "X1", and shown in phantom lines in FIG. 2B.

After that, when the roller arm 6 further approaches the other end position of the stroke path in the side of the read/write portion 103, the front one the cartridge transfer-roller 5 (leading one) of the cartridge transfer-rollers 4, 5 has its pin 14 (front sub-engaging projection) enter the front sub-guide 16 which extends outward to form the extension of the guide 7. Then, the pin 14 forming the front sub-engaging projection of the roller arm 6 begins to move outward along the front sub-guide 16, as shown in FIG. 2B. Since the connection portion disposed between the guide 7 and the front sub-guide 16 is properly rounded in shape, it is possible for the pin 14 (front sub-engaging projection of the roller arm 6) to smoothly transfer from the guide 7 to the front sub-guide 16

As a result, as is clear from FIG. 7A, the roller arm 6 rotates on its center pin 12 which forms the main-engaging projection of the roller arm 6. Due to its rotation described above, the roller arm 6 has its front cartridge transfer-roller 5 moved outward in a direction perpendicular to the transfer path of the magnetic tape cartridge 1011 and its rear cartridge transfer-roller 4 moved inward relative to the transfer path of the magnetic tape cartridge 101, so that the roller arm 6 reaches its oblique position "X1" (shown in FIG. 2B).

As shown in FIG. 2A, a front sub-engaging projection separation recess 18 is formed in the vicinity of the other end position of the stroke path (hereinafter also referred to as the stroke end position of the guide 7) in the side of the read/write portion 103. As for the guide 7, there is no danger that the guide 7 interferes with the pin 13 (rear sub-engaging projection of the roller arm 6) when the roller arm 6 rotates on its center pin 12 (main-engaging projection of the roller arm 6), because the roller arm 6 has its rear pin 13 depart inwardly from the guide 7 in the vicinity of its stroke-end position through the front sub-engaging projection separation recess 18. At this time, rotation of the roller arm 6 itself is accomplished through a so-called "two-point support" for the roller arm 6. More specifically, this two-point support for the roller arm 6 is realized by means of the center pin 12 and the front pin 14, wherein the front pin 14 is pivoted to the leading end portion of the roller arm 6. As shown in FIG. 2B, these pins 12 and 14 form the main-engaging projections and the front sub-engaging projection, respectively, and slidably engage with the guide 7 and the front sub-guide 16, respectively.

Consequently, the roller arm rotary driving means for rotatably driving the roller arm 6 at this stage is constructed of: the center pin 12 forming the main-engaging projection of the roller arm 6; the front pin 14 forming the front sub-engaging projection of the roller arm 6; the front sub-engaging projection separation recess 18 through which the rear pin 13 (rear sub-engaging projection of the roller arm 6) is permitted to separate from the guides 7; the front sub-guide 16; and, the above-mentioned roller arm linear driving means for linear driving the roller arm 6 along the guide 7.

Figure 8A:
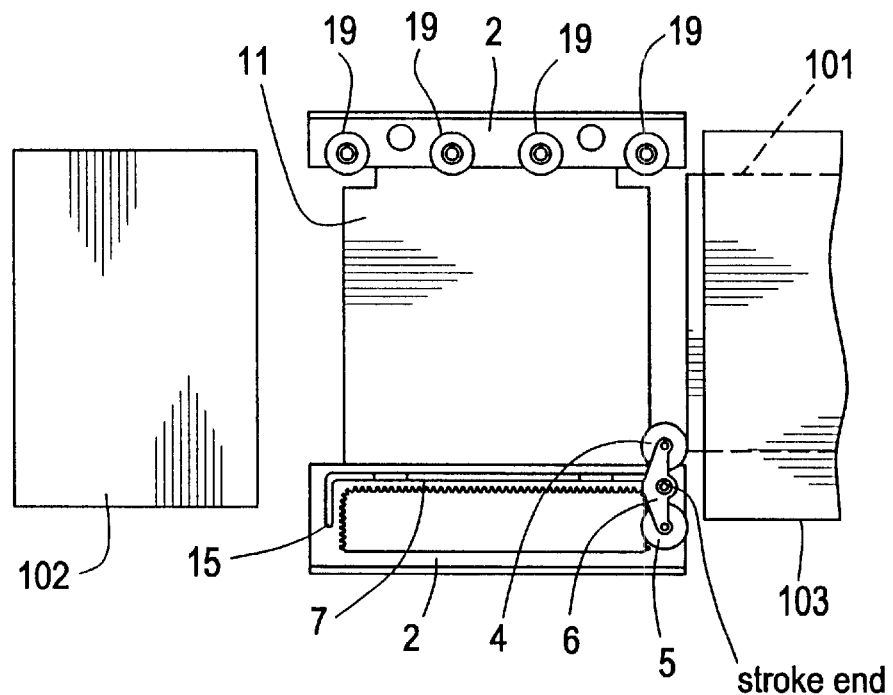
FIGS. 8A and 8B are plan views of the recording medium library apparatus shown in FIG. 1A, illustrating a positive pushing operation of the magnetic tape cartridge performed by the roller arm with the aid of its cartridge transfer-roller and return operation of the roller arm, respectively.

In operation, when the roller arm 6 has reached the stroke end position in the side of the read/write portion 103, the roller arm 6 further rotates as shown in FIG. 8A (more clearly, as shown in FIG. 2B) to reach its vertical position "X2" shown in phantom lines as viewed in FIG. 2B. Due to this, the rear cartridge transfer-roller 4 provided in the trailing end of the roller arm 6 positively pushes a rear-end surface of the magnetic tape cartridge 101 forward in its insertion direction into the read/write portion 103.

As is clear from FIG. 7B, at this stage, the rear-end surface of the magnetic tape cartridge 101 has already passed over forward the rear cartridge transfer-roller 4 provided in the trailing end portion of the roller arm 6. Due to this, there is no danger that the rear cartridge transfer-roller 4 interferes with a side surface of the magnetic tape cartridge 101. More specifically, since the rear-end surface of the magnetic tape cartridge 102 has already passed over the rear cartridge transfer-roller 4, such interference between the cartridge transfer-roller 4 and the side surface of the magnetic tape cartridge 101 does not occur. As described above, in order to ensure that the rear-end surface of the magnetic tape cartridge 101 has completely passed over the rear cartridge transfer-roller 4 of the trailing end of the roller arm 6 before the roller arm 6 begins to rotate, it is necessary to design in diameter each of the cartridge transfer-rollers 4, 5 and the gears 9, 10 in a manner such that a forward feed amount of the magnetic tape cartridge 101 transferred forward via the cartridge transfer-rollers 4, 5 is approximately equal in length to half the entire length of the magnetic tape cartridge 101, or slightly larger in length than the half of the entire length of the magnetic tape cartridge 101 before the roller arm 6 transferred from its home position reaches a front-end portion of the guide 7.

As described above, a concrete means for accomplishing such cartridge positively loading function in the tape cartridge loading/unloading mechanism 3 is constructed of individual components of the roller arm rotary driving means, namely: the center pin 12 forming the main-engaging projections of the roller arm 6; the front pin 14 forming the front sub-engaging projection of the roller arm 6; the front sub-engaging projection separation recess 18 for permitting the rear pin 13 of the roller arm 6 to separate from the guide 7; the front sub-guide 16; the roller arm linear drive means; the roller arm 6; and, the rear cartridge transfer-roller 4 provided in the trailing end of the roller arm 6.

As a result of the pushing operation performed by the rear cartridge transfer-roller 4 provided in the trailing end of the roller arm 6, the magnetic tape cartridge 101 is positively loaded into the read/write portion 103 to reach its fully loaded position. After that, the read/write portion 103 performs its lock function to hold the magnetic tape cartridge 101 at the above fully loaded position, as shown in FIG. 8A.

As described above, in the above loading operation of the magnetic tape cartridge 101 into the read/write portion 103, since the front cartridge transfer-roller 4 directly pushes forward the rear-end surface of the magnetic tape cartridge 101, it is possible to load the magnetic tape cartridge 101 into the read/write portion 103, without fail even when the magnetic tape cartridge 101 is soiled, and/or even when the cartridge transfer-rollers 4, 5 have worn.

Naturally, it is also possible for the embodiment of the tape cartridge loading/unloading mechanism 3 to have another set of additional components, such as another guide 7, another roller arm 6, another rack 8, another cartridge transfer-roller 4, another cartridge transfer-roller 5, and a like. However, in this embodiment, in order to simplify an entire magnetic tape library apparatus 1 (shown in FIG. 1B) in construction, as shown in FIG. 1B, the row 20 of the plurality of rollers 19 is disposed in only one of opposite-side portions of the magnetic tape library apparatus 1 to serve as one of feed mechanisms for transferring the magnetic tape cartridge 101 forward.

As described above, the magnetic tape cartridge 101 is loaded into the read/write portion 103. After completion of such loading of the magnetic tape cartridge 101 into the read/write portion 103, all the above-mentioned roller arm linear drive means and the rollers 19 in the row 20 are driven again but in the reverse direction. Due to this, and since the roller arm 6 has its center pin 12 slidably engaged with the guide 7 so as to be slidably guided thereby, the roller arm 6 is returned back to its home position along the guide 7 from the stroke end position located in the side of the read/write portion 103. As is clear from FIG. 2B, in its vertical position "X2" (as viewed in FIG. 2B) which is shown in phantom lines and located in the side of the read/write portion 103, the roller arm 6 has its center pins 12 and its front pin 14 engaged with the guide 7 and the front sub-guide 16, respectively. Consequently, when the center pin 12 of the roller arm 6 is moved rearward toward its home position from this vertical position "X2" as viewed in FIG. 2B, the roller arm 6 supported through the two-point support realized by means of these pins 12 and 14 gradually rotates counterclockwise to reach its oblique position "X1" shown in phantom lines in FIG. 2B. When the front pin 14 (front sub-engaging projection) having been engaged with the front sub-guide 16 leaves this sub-guide 16 to enter the guide 7 and the rear pin 13 having been separated from the guide 7 enters the guide 7 through the front sub-engaging projection separation recess 18, the roller arm 6 returns back to its horizontal position "X3" (shown in solid lines in FIG. 2B). In this horizontal position "X3", the roller arm 6 has all its pins 12, 13 and 14 slidably engaged with the guide 7.

Figure 8B:
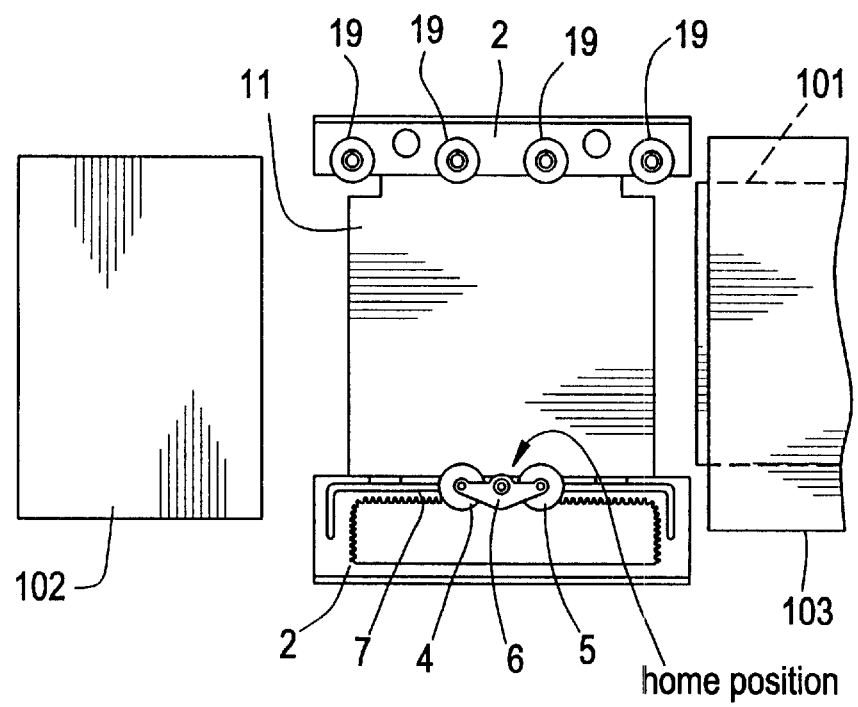

The roller arm 6 having returned back to its home position is shown in FIG. 8B. There is no difference between this home position and the initial position shown in FIG. 4A. Incidentally, before reaching this home position, the roller arm 6 rotates counterclockwise to have its cartridge transfer-rollers 4, 5 rotated also counterclockwise, as is clear from FIGS. 8A and 8B. At this time, although each of the rollers 19 in the row 20 rotates clockwise, such rotation has no effect on the magnetic tape cartridge 101 since the tray 11 of the carrier 2 carries no magnetic tape cartridge 101 thereon.

The above is the description in operation of the tape cartridge loading/unloading mechanism 3 through which the magnetic tape cartridge 101 is retrieved (unloaded) from the cartridge storage portion 102 and inserted (loaded) into the read/write portion 103. By simply reversing this procedure, the tape cartridge loading/unloading mechanism 3 is capable of retrieving the magnetic tape cartridge 101 from the read/write portion 103 in the same manner as that shown in FIG. 5A and inserting the same magnetic tape cartridge 101 into the cartridge storage portion 102 in the same manner as that shown in FIG. 8B. For example, FIG. 5B may also show the magnetic tape cartridge 101 which is loaded into the cartridge storage portion 102 in its loading operation.

In this embodiment, the guide 7 is provided substantially over the entire length of the carrier 2, which makes it possible to provide the roller arm rotary driving means for rotatably driving the roller arm 6 in each of the opposite-end portions of the guide 7. Due to this, it is possible for the magnetic tape cartridge 101 to horizontally pass through the carrier 2 in its loading/unloading operation. More specifically, as shown in FIGS. 1A and 1B, a horizontal gap between the cartridge storage portion 102 and the read/write portion 103 is substantially bridged by the guide 7. This enables the guide 7 to freely retrieve (unload) the magnetic tape cartridge 101 from the cartridge storage portion 102, and insert (load) the thus retrieved cartridge 101 into the read/write portion 103.

It is also possible to use a modification of this embodiment. In such the modification, the cartridge storage portion 102 is disposed in a vertically overlapping relationship with the read/write portion 103 in one of the opposite-end portions of the carrier 2.

When the cartridge storage portion 102 is disposed in the vertically overlapping relationship with the read/write portion 103 in one of the opposite-end portions of the carrier 2, it is possible to dispose the sub-guides 15, 16 together with the sub-engaging projection separation recesses 17, 18 only in the side of one of the opposite-end-portions of the carrier 2, the side of which one is oppositely disposed from both the cartridge storage portions 102 and the read/write portion 103 thus vertically stacked. In other words, in this modification of the embodiment, both the sub-guides 15, 16 and the sub-engaging projection separation recesses 17, 18 are not required in the side of the other of the opposite-end portions of the carrier 2.

The effects of the present invention having the above construction are as follows, namely, in the magnetic tape library apparatus 1 (shown in FIG. 1B): at the final stage of the loading operation of the magnetic tape cartridge 101 into the read/write portion 103 or into the cartridge storage portion 102, since the rear-end surface or the front-end surface of the magnetic tape cartridge 101 is positively pushed forward or rearward by the tape cartridge loading/ unloading mechanism 3, it is possible to smoothly transfer the magnetic tape cartridge 101 from the tray 11 of the carrier 2 to the read/write portion 103 or to the cartridge storage portion 102 so as to have the magnetic tape cartridge 101 smoothly loaded into the read/write portion 102 or into the cartridge storage portion 102 without fail, even when the magnetic tape cartridge 101 is soiled, and/or even when the cartridge transfer-rollers 4, 5 have worn.

Further, each of the cartridge transfer-rollers 4, 5 is pivoted to each of the opposite-end portions of the roller arm 6, linear moved in the loading/unloading directions of the magnetic tape cartridge 101, and rotary driven so as to positively push the magnetic tape cartridge 101 forward or rearward in its loading operation. In other words, the linear motion of the roller arm 6 is combined with the rotationally driven motion of each of its cartridge transfer-rollers 4, 5 to help speed and smooth the loading/unloading operation of the magnetic tape cartridge 101 performed between the carrier 2 and each of the cartridge storage portion 102 and the read/write portion 103.

Further, as for the means for positively pushing each of the opposite rear-end surfaces of the magnetic tape cartridge 101, this means may be constructed of: the roller arm 6 for transferring the magnetic tape cartridge 101; and, the cartridge transfer-rollers 4, 5. In operation, after completion of transfer of the magnetic tape cartridge 101 toward the read/write portion 103 or toward the cartridge storage portion 102, the roller arm 6 is rotary driven so that its cartridge transfer-roller 4 or 5 positively pushes the rear-end surface or the front-end surface of the magnetic tape cartridge 101. Due to this, it is possible for the tape cartridge loading/unloading mechanism 3 to reduce the number of its components, which makes it possible to reduce manufacturing cost of the magnetic tape library apparatus 1.

Furthermore, the roller arm 6, which enables each of its cartridge transfer-rollers 4, 5 to positively push the rear-end surface or the front-end surface of the magnetic tape cartridge 101, is initially disposed adjacent to the transfer path of the magnetic tape cartridge 101. And, only when the magnetic tape cartridge 101 is finally loaded into the read/write portion 103 or into the cartridge storage portion 102, the roller arm 6 is rotary driven on its center pin 12 to have its cartridge transfer-roller 4 or 5 projected into the transfer path of the magnetic tape cartridge 101. Due to this, it is possible for the cartridge loading/unloading mechanism 3 to reduce the entire length of the magnetic tape library apparatus 1 in an easy manner in comparison with each of the conventional magnetic tape library apparatuses one of which is provided with the conventional magnetic tape cartridge loading/unloading mechanism in which its pickup hand is disposed on an extension line of the transfer path of the magnetic tape cartridge 101.

Further, in the magnetic tape library apparatus 1 of the present invention, since there is no obstacle on the extension line of the transfer path of the magnetic tape cartridge 101, it is possible to employ a construction in which the magnetic tape cartridge 101 may smoothly pass through the carrier 2.

In the cartridge loading/unloading mechanism 3 of the present invention, the roller arm 6 is transferred over a distance substantially equal to the entire length of the carrier 2 to make it possible to positively load the magnetic tape cartridge 101 into the read/write portion 103 or into the cartridge storage portion 102 when the roller arm 6 reaches the front end portion or the rear-end portion of the carrier 2. Since the cartridge loading/unloading mechanism 3 has the above construction, it is possible to provide the cartridge storage portion 102 and the read/write portion 103 on the opposite-side portions of the carrier 2, and also possible to vertically pack the cartridge storage portion 102 and the read/write portion 103 together in a stack in one of the opposite-side portions of the carrier 2. Due to this, the present invention may improve both the cartridge storage portion 102 and the read/write portion 103 in design freedom with respect to their arrangements.

Further, in the case where the positive loading operation of the magnetic tape cartridge 101 into the read/write portion 103 or into the cartridge storage portion 102 is carried out in the front end portion or in the rear-end portion of the carrier 2: the home position (shown in FIG. 6B) of the roller arm 6 is set at a central portion of the carrier 2; and, a feed amount of the magnetic tape cartridge 101 transferred forward or rearward via the cartridge transfer-rollers 4, 5 is approximately equal in length to half the entire length of the magnetic tape cartridge 101, or slightly larger in length than the half of the entire length of the magnetic tape cartridge 101 before the roller arm 6 having been transferred from its home position reaches the front-end portion or the rear-end portion of the carrier 2. Consequently, in the tape cartridge loading/unloading mechanism 3, there is no need of providing any mechanical stopping means for ensuring that the magnetic tape cartridge 101 is always held steadily in the central portion of the carrier 2 without fail after the magnetic tape cartridge 101 is received by the carrier 2.

Furthermore, in the tape cartridge loading/unloading mechanism 3 having the above construction, since the rotational motion of the roller arm 6 on its center pin 12 starts after completion of the forward transfer operation or the rearward transfer operation of the magnetic tape cartridge 101 via the cartridge transfer-rollers 4, 5 (the rear one 4 or the front one 5 of which has already passed over the rear-end surface or the front-end surface of the magnetic tape cartridge 101 forward or rearward, respectively), there is no danger that the rear one 4 or the front one 5 of the cartridge transfer-rollers 4, 5 for positively pushing the magnetic tape cartridge 101 forward or rearward interferes with the side surface of the magnetic tape cartridge 101 at the final stage of the loading operation. Consequently, the rear one 4 or the front one 5 of the cartridge transfer-roller 4, 5 in the tape cartridge loading/unloading, mechanism 3 is capable of positively pushing the rear-end surface or the front-end surface of the magnetic tape cartridge 101 in the front-end portion or in the rear-end portion of the carrier 2, respectively, without fail.

Further, since the rear-end surface or the front-end surface of the magnetic tape cartridge 101 is directly pushed by the cartridge transfer-roller 4 or 5 at the final stage of the loading operation of the magnetic tape cartridge 101, it is possible to load (insert) the magnetic tape cartridge 101 into the read/write portion 103 or into the cartridge storage portion 102, without fail. Due to this, the roller arm 6 disposed only in one of the opposite-side portions of the carrier 2 is quite enough for the purpose of the tape cartridge loading/unloading mechanism 3 in the loading/unloading operation of the magnetic tape cartridge 101.

Consequently, it is possible to considerably reduce manufacturing cost of the magnetic tape library apparatus 1 by providing the single row 20 of the rollers 19 in the other of the opposite-side portions of the carrier 2 in order to sandwich the magnetic tape cartridge 101 between the cartridge transfer-rollers 4, 5 and this single row 20 of the rollers 19 during the transfer operation of the magnetic tape cartridge 101.

Furthermore, in the tape cartridge loading/unloading mechanism 3: the rack 8 is disposed adjacent to the carrier 2, and meshes with each of the gears 9, 10 of the individual cartridge transfer-rollers 4, 5; the linear motion of the roller arm 6 to which the cartridge transfer-rollers 4, 5 are pivoted is combined with such meshing engagement established between the rack 8 and each of the gears 9, 10 to realize the rotational motion of each of the cartridge transfer-rollers 4, 5; and, the rotational motion of the roller arm 6 itself on its center pin 12 is realized through slidable engagement between the engaging projections, pins 12, 13, 14, of the roller arm 6 and each of the guide 7 and the sub-guides 15, 16 by using the linear motion of the roller arm 6 itself. Due to this, it is possible to simplify in construction the tape cartridge loading/unloading mechanism 3, and, therefore possible to reduce the manufacturing cost of the cartridge loading/unloading mechanism 3, because it is possible for the tape cartridge loading/unloading mechanism 3 to drive all its movable components by using the single drive means for linear driving the roller arm 6, and, therefore any other drive means for individually driving the cartridge transfer-rollers 4, 5 and the roller arm 6 is not required in this cartridge loading/unloading mechanism 3.

Further, in the case where both the guide 7 and the sub-guides 15, 16 are used as the components of the means for rotatably driving the roller arm 6, the guide 7 is smoothly connected with each of the sub-guides 15, 16 through the substantially circularly-curved connection portion arranged therebetween. Due to this, there is no danger that the engaging projections, pins 12, 13, 14, of the roller arm 6 are prevented from smoothly passing through these connection portions. Consequently, it is possible to smoothly transfer the roller arm 6 from its linear motion into its rotational motion.

It is apparent that the present invention is not limited to the above embodiments but may be changed and modified without departing from the scope and spirit of the invention.

For example, the present invention is equally applicable to a recording medium library apparatus such as a magneto-optical (MO) library apparatus which holds a plurality of magneto-optical (MO) disk cartridges or magneto-optical (MO) tape cartridges; an optical (CD, or a like) library apparatus which holds a plurality of optical disk cartridges or optical tape cartridges.

What is claimed is:

1. A recording medium library apparatus comprising: a cartridge storage portion for storing a plurality of magnetic tape cartridges therein; a read/write portion for reading/writing data from/to said magnetic tape cartridge; a carrier which is reciprocally moved between said cartridge storage portion and said read/write portion in a condition in which said carrier holds said magnetic tape cartridge therein; and, a tape cartridge loading/unloading mechanism provided in said carrier, wherein:

said tape cartridge loading/unloading mechanism is of a transfer-roller type; and, at a final stage of a loading operation of said magnetic tape cartridge into said read/write portion or into said cartridge storage portion, said tape cartridge loading/unloading mechanism functions to positively push a rear-end portion or a front-end portion of said magnetic tape cartridge forward or rearward to complete said loading operation.

2. A magnetic tape library apparatus comprising: a cartridge storage portion for storing a plurality of magnetic tape cartridges therein; a read/write portion for reading/writing data from/to said magnetic tape cartridge; a carrier which is reciprocally moved between said cartridge storage portion and said read/write portion in a condition in which said carrier holds said magnetic tape cartridge therein; and, a tape cartridge loading/unloading mechanism provided in said carrier, wherein:

said tape cartridge loading/unloading mechanism is provided with: a pair of cartridge transfer-rollers which are disposed adjacent to a transfer path of said magnetic tape cartridge on said carrier, and spaced a predetermined distance away from each other in a loading/unloading direction of said magnetic tape cartridge; a roller arm which has said pair of said cartridge transfer-rollers pivoted to its opposite-end portions; a guide for guiding in motion said roller arm along said transfer path of said magnetic tape cartridge in said loading/unloading direction thereof; a roller arm linear driving means for linear driving said roller arm along said guide; a transfer-roller rotary driving means for rotatably driving said pair of said cartridge transfer-rollers in a manner such that said pair of said cartridge transfer-rollers linearly move said magnetic tape cartridge in a direction in which said roller arm is linearly driven; and, a roller arm rotary driving means for rotatably driving said roller arm itself when said roller arm reaches a front-end portion or a rear-end portion of said guide, in which end portion a trailing one or a leading one of said pair of said cartridge transfer-rollers separates from both said guide and a side surface of said magnetic tape cartridge outwardly on said carrier while said leading one or said trailing one of said pair of said cartridge transfer-rollers projects inwardly into said transfer path of said magnetic tape cartridge upon rotation of said roller arm.

3. The recording medium library apparatus according to claims 2, wherein: said guide extends substantially over an entire length of said carrier in said loading/unloading direction of said magnetic tape cartridge; and, said roller arm rotary driving means operates at time when said roller arm reaches each of a front-end portion and a rear-end portion of said guide.

4. The recording medium library apparatus according to claim 3, wherein: a home position of said roller arm is set at a central portion of said guide; and, a feed amount of said magnetic tape cartridge transferred forward or rearward via one of said pair of said cartridge transfer-rollers reaches substantially half the entire length of said magnetic tape cartridge before said roller arm transferred from said home position reaches said front-end portion or said rear-end portion of said guide.

5. The recording medium library apparatus according to claim 2, wherein: provided in only one of opposite-side portions of said carrier are said pair of said cartridge transfer-rollers, said roller arm, said guide, said roller arm linear driving means, and said roller arm rotary driving means; and, provided in an other of said opposite-side portions of said carrier is a row of a plurality of rollers which cooperate with said pair of said cartridge transfer-rollers to sandwich said magnetic tape cartridge therebetween and transfer said magnetic tape cartridge forward or rearward.

6. The recording medium library apparatus according to claim 2, wherein: said guide is constructed of a groove; a rack is disposed adjacent to said guide outside said transfer path of said magnetic tape cartridge to extend in parallel to said guide; gears capable of meshing with said rack are integrally formed with said pair of said cartridge transfer-rollers; a main-engaging projection is provided in a central portion of said roller arm, and slidably engaged with said guide in an insertion manner to ensure that said rack meshes with said gears without fail, so that said transfer-roller rotary driving means is constructed of said rack, said gears and said roller arm linear driving means, wherein said roller arm linear driving means moves said main-engaging projection along said guide; sub-engaging projections are provided in a vicinity of each of a pair of pivoted portions of said cartridge transfer-rollers in said roller arm, wherein said sub-engaging projections are shorter in length than said main-engaging projection and slidably engaged with said guide together with said main-engaging projection in an insertion manner; sub-engaging projection separation areas are formed in a vicinity of each of a front-end portion and a rear-end portion of said guide to permit only said sub-engaging projections to escape from said groove of said guide through said sub-engaging projection separation areas by setting a height of said groove in said sub-engaging projection separation areas at a value shorter than a length of said main-engaging projection having been inserted in said groove of said guide so as to prevent only said main-engaging projection from escaping from said groove through said sub-engaging projection separation areas; sub-guides which are identical in construction with said guide and connected with each of said front-end portion and said rear-end portion of said guide to form an extension thereof; and, said roller arm rotary driving means is constructed of said main-engaging projection, said sub-engaging projections, said sub-engaging projection separation areas, said sub-guides, and said roller arm linear driving means.

7. The recording medium library apparatus according to claim 6, wherein a connection portion through which said guide is connected with said sub-guides assumes a substantially circularly-curved shape.

8. The recording medium library apparatus according to claim 6, wherein: said guide extends substantially over said entire length of said magnetic tape cartridge in said loading/unloading direction thereof on said carrier; and, both said sub-engaging projection separation areas and said sub-guides are provided in each of said front-end portion and said rear-end portion of said guide.

9. The recording medium library apparatus according to claim 6, wherein: a home position of said roller arm is set at a central portion of said guide; and, a ratio in diameter between said pair of said cartridge transfer-rollers and said gears is designed in a manner such that a feed amount of said magnetic tape cartridge transferred forward or rearward via one of said pair of said cartridge transfer-rollers reaches substantially half the entire length of said magnetic tape cartridge before said roller arm transferred from said home position reaches said front-end portion or said rear-end portion of said guide.

10. The recording medium library apparatus according to claim 6, wherein: provided in only one of opposite-side portions of said carrier are said guide, said rack, said pair of said cartridge transfer-rollers, said roller arm, said sub-engaging projection separation areas, and said sub-guides; and, provided in the other of said opposite-side portions of said carrier is a row of a plurality of rollers which cooperate with said pair of said cartridge transfer-rollers to sandwich said magnetic tape cartridge therebetween and transfer said magnetic tape cartridge forward or rearward.

11. A recording medium library apparatus comprising: a cartridge storage portion for storing a plurality of recording medium cartridges therein; a read/write portion for reading/writing data from/to said recording medium cartridge; a carrier which is reciprocally moved between said cartridge storage portion and said read/write portion in a condition in which said carrier holds said recording medium cartridge therein; and, a recording medium cartridge loading/unloading mechanism provided in said carrier, wherein:
said recording medium cartridge loading/unloading mechanism is of a transfer-roller type; and,
at a final stage of a loading operation of said recording medium cartridge into said read/write portion or into said cartridge storage portion, said recording medium cartridge loading/unloading mechanism functions to positively push a rear-end portion or a front-end portion of said recording medium cartridge forward or rearward to complete said loading operation.

12. A recording medium library apparatus comprising: a cartridge storage portion for storing a plurality of recording medium cartridges therein; a read/write portion for reading/writing data from/to said recording medium cartridge; a carrier which is reciprocally moved between said cartridge storage portion and said read/write portion in a condition in which said carrier holds said recording medium cartridge therein; and, a recording medium cartridge loading/unloading mechanism provided in said carrier, wherein:
said recording medium cartridge loading/unloading mechanism is provided with: a pair of cartridge transfer-rollers which are disposed adjacent to a transfer path of said recording medium cartridge on said carrier, and spaced a predetermined distance away from each other in a loading/unloading direction of said recording medium cartridge; a roller arm which has said pair of said cartridge transfer-rollers pivoted to its opposite-end portions; a guide for guiding in motion said roller arm along said transfer path of said recording medium cartridge in said loading/unloading direction thereof; a roller arm linear driving means for linear driving said roller arm along said guide; a transfer-roller rotary driving means for rotatably driving said pair of said cartridge transfer-rollers in a manner such that said pair of said cartridge transfer-rollers linearly move said recording medium cartridge in a direction in which said roller arm is linearly driven; and, a roller arm rotary driving means for rotatably driving said roller arm itself when said roller arm reaches a front-end portion or a rear-end portion of said guide, in which end portion a trailing one or a leading one of said pair of said cartridge transfer-rollers separates from both said guide and a side surface of said recording medium cartridge outwardly on said carrier while said leading one or said trailing one of said pair of said cartridge transfer-rollers projects inwardly into said transfer path of said recording medium cartridge upon rotation of said roller arm.

13. The recording medium library apparatus according to claims 12, wherein: said guide extends substantially over an entire length f said carrier in said loading/unloading direction of said recording medium cartridge; and, said roller arm rotary driving means operates at a time when said roller arm reaches each of a front-end portion and a rear-end portion of said guide.

14. The recording medium library apparatus according to claim 13, wherein: a home position of said roller arm is set at a central guide; and, a feed amount of said recording medium cartridge transferred forward or rearward via one of said pair of said cartridge transfer-rollers reaches substantially half the entire length of said recording medium cartridge before said roller arm transferred from said home position reaches said front-end portion or said rear-end portion of said guide.

15. The recording medium library apparatus according to claim 12, wherein: provided in only one of opposite-side portions of said carrier are said pair of said cartridge transfer-rollers, said roller arm, said guide, said roller arm linear driving means, and said roller arm rotary driving means; and, provided in an other of said opposite-side portions of said carrier is a row of a plurality of rollers which cooperate with said pair of said cartridge transfer-rollers to sandwich said recording medium cartridge therebetween and transfer said recording medium cartridge forward or rearward.

16. The recording medium library apparatus according to claim 12, wherein: said guide is constructed of a groove; a rack is disposed adjacent to said guide outside said transfer path of said recording medium cartridge to extend in parallel to said guide; gears capable of meshing with said rack are integrally formed with said pair of said cartridge transfer-rollers; a main-engaging projection is provided in a central portion of said roller arm, and slidably engaged with said guide in an insertion manner to ensure that said rack meshes with said gears without fail, so that said transfer-roller rotary driving means is constructed of said rack, said gears and said roller arm linear driving means, wherein said roller arm linear driving means moves said main-engaging projection along said guide; sub-engaging projections are provided in a vicinity of each of a pair of pivoted portions of said cartridge transfer-rollers in said roller arm, wherein said sub-engaging projections are shorter in length than said main-engaging projection and slidably engaged with said guide together with said main-engaging projection in an insertion manner; sub-engaging projection separation areas are formed in a vicinity of each of a front-end portion and a rear-end portion of said guide to permit only said sub-engaging projections to escape from said groove of said guide through said sub-engaging projection separation areas by setting a height of said groove in said sub-engaging projection separation areas at a value shorter than a length of said main-engaging projection having been inserted in said groove of said guide so as to prevent only said main-engaging projection from escaping from said groove through said sub-engaging projection separation areas; sub-guides which are identical in construction with said guide and connected with each of said front-end portion and said rear-end portion of said guide to form an extension thereof; and, said roller arm rotary driving means is constructed of said main-engaging projection, said sub-engaging projections, said sub-engaging projection separation areas, said sub-guides, and said roller arm linear driving means.

17. The recording medium library apparatus according to claim 16, wherein a connection portion through which said guide is connected with said sub-guides assumes a substantially circularly-curved shape.

18. The recording medium library apparatus according to claim 16, wherein: said guide extends substantially over said entire length of said recording medium cartridge in said loading/unloading direction thereof on said carrier; and, both said sub-engaging projection separation areas and said sub-guides are provided in each of said front-end portion and said rear-end portion of said guide.

19. The recording medium library apparatus according to claim 16, wherein: a home position of said roller arm is set at a central portion of said guide; and, a ratio in diameter between said pair of said cartridge transfer-rollers and said gears is designed in a manner such that a feed amount of said recording medium cartridge transferred forward or rearward via one of said pair of said cartridge transfer-rollers reaches substantially half the entire length of said recording medium cartridge before said roller arm transferred from said home position reaches said front-end portion or said rear-end portion of said guide.

20. The recording medium library apparatus according to claim 16, wherein: provided in only one of opposite-side portions of said carrier are said guide, said rack, said pair of said cartridge transfer-rollers, said roller arm, said sub-engaging projection separation areas, and said sub-guides; and, provided in the other of said opposite-side portions of said carrier is a row of a plurality of rollers which cooperate with said pair of said cartridge transfer-rollers to sandwich said recording medium cartridge therebetween and transfer said recording medium cartridge forward or rearward.

* * * * *

(12) EX PARTE REEXAMINATION CERTIFICATE (5178th)
United States Patent
Iwabuchi

(10) Number: US 6,504,671 C1
(45) Certificate Issued: Aug. 9, 2005

(54) RECORDING MEDIUM CARTRIDGE LIBRARY APPARATUS WITH TRANSFER-ROLLERS

(75) Inventor: Masanori Iwabuchi, Ibaraki (JP)

(73) Assignee: NEC Corporation, Tokyo (JP)

Reexamination Request:
No. 90/006,651, May 23, 2003

Reexamination Certificate for:
Patent No.: 6,504,671
Issued: Jan. 7, 2003
Appl. No.: 09/725,216
Filed: Nov. 29, 2000

(30) Foreign Application Priority Data

Nov. 29, 1999 (JP) .............................. 11-337550

(51) Int. Cl.$^7$ .............................................. G11B 15/68
(52) U.S. Cl. ......................................................... 360/92
(58) Field of Search .............................. 360/92, 91, 90, 360/88, 98.04, 98.06; 369/30.4, 30.43, 30.45, 30.49, 30.65, 30.7, 30.72

(56) References Cited

U.S. PATENT DOCUMENTS

| | | | | |
|---|---|---|---|---|
| 4,802,035 A | * | 1/1989 | Ohtsuka ........................ | 360/92 |
| 4,910,619 A | * | 3/1990 | Suzuki et al. ................. | 360/92 |
| 5,815,340 A | * | 9/1998 | Barkley et al. ............... | 360/92 |
| 5,847,897 A | * | 12/1998 | Marlowe ....................... | 360/92 |
| 5,850,376 A | * | 12/1998 | Shihoh ......................... | 369/30.32 |

FOREIGN PATENT DOCUMENTS

| | | | | | |
|---|---|---|---|---|---|
| GB | 2286715 A | * | 8/1995 | ........... | G11B/17/04 |
| JP | 01091359 A | * | 4/1989 | ........... | G11B/15/68 |
| JP | 02078053 A | * | 3/1990 | ........... | G11B/17/26 |
| JP | H6-52040 | | 7/1994 | | |
| JP | H6-274989 | | 9/1994 | | |
| JP | 08007447 A | * | 1/1996 | ........... | G11B/17/26 |
| JP | 09326156 A | * | 12/1997 | ........... | G11B/17/26 |

* cited by examiner

*Primary Examiner*—William J. Klimowicz

(57) ABSTRACT

A recording medium library apparatus is constructed of a magnetic tape library apparatus which is capable of smoothly transferring a magnetic tape cartridge among a carrier, a cartridge storage portion and a read/write portion by sandwiching the magnetic tape cartridge between cartridge transfer-rollers and a row of rollers. In the recording medium library apparatus, during a final stage of a loading operation of the magnetic tape cartridge into the read/write portion or into the cartridge storage portion, a roller arm itself is rotary driven on its center pin in a manner such that cartridge transfer-rollers pivoted to each of opposite-end portions of the roller arm directly pushes a rear-end surface or a front end surface of the magnetic tape cartridge. Consequently, it is possible for the magnetic tape library apparatus to perform smooth transfer operation of the magnetic tape cartridge and direct pushing operation of the rear-end surface or the front end surface of the magnetic tape cartridge at the final stage of the loading operation of the magnetic tape cartridge, without fail.

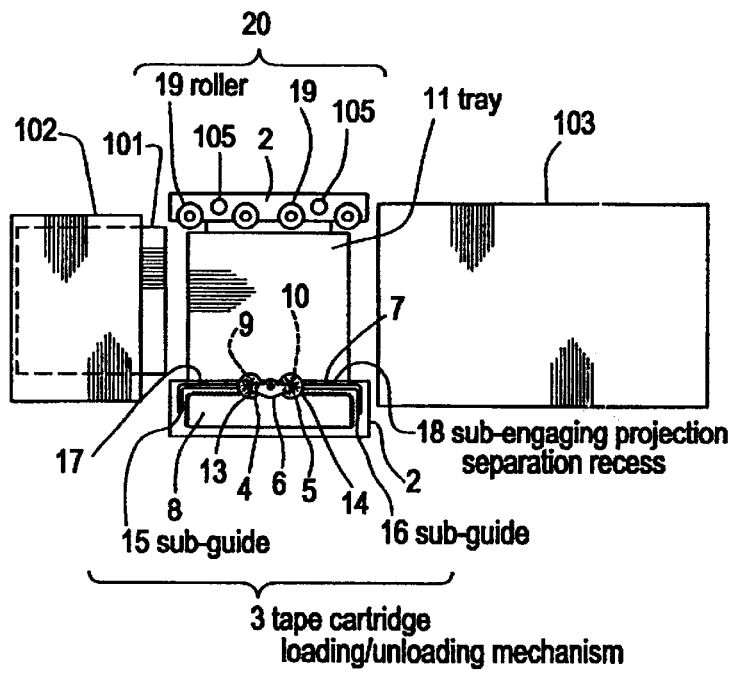

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2–10 and 12–20 is confirmed.

Claims 1 and 11 are cancelled.

* * * * *